United States Patent
Steffan et al.

(10) Patent No.: US 6,303,366 B1
(45) Date of Patent: Oct. 16, 2001

(54) BIODEGRADATION OF THE GASOLINE OXYGENATES

(75) Inventors: Robert Jon Steffan, Newtown; Charles Whitman Condee; Kevin Rock McClay, both of Morrisville; Jennifer Diane Michelson, Yardley, all of PA (US); Mary F. DeFlaun, Princeton, NJ (US)

(73) Assignee: Envirogen, Inc., Lawrenceville, NJ (US)

( * ) Notice: Subject to any disclaimer, the term of this patent is extended or adjusted under 35 U.S.C. 154(b) by 0 days.

(21) Appl. No.: 09/214,751

(22) PCT Filed: Jul. 10, 1997

(86) PCT No.: PCT/US97/12257

§ 371 Date: Aug. 10, 1999

§ 102(e) Date: Aug. 10, 1999

(87) PCT Pub. No.: WO98/01241

PCT Pub. Date: Jan. 15, 1998

(51) Int. Cl.[7] .................................................. C07C 00/00
(52) U.S. Cl. ........................ 435/262; 435/262.5; 435/863
(58) Field of Search ................................ 435/262, 262.5, 435/264, 281, 283, 863

(56) References Cited

U.S. PATENT DOCUMENTS

| | | | |
|---|---|---|---|
| 4,855,051 | * | 8/1989 | Insell ..................................... 210/601 |
| 5,221,159 | * | 6/1993 | Billings ................................ 405/128 |
| 5,277,518 | * | 1/1994 | Billings ................................ 405/128 |
| 5,399,495 | * | 3/1995 | Patt et al. ............................. 435/254.1 |
| 5,427,944 | * | 6/1995 | Lee et al. ............................. 435/262.5 |
| 5,472,294 | * | 12/1995 | Billings ................................ 405/128 |
| 5,474,934 | * | 12/1995 | Adamus et al. ................... 435/262.5 |
| 5,814,514 | * | 9/1998 | Steffan et al. ........................ 435/262 |
| 5,902,734 | * | 5/1999 | Salanitro ................................ 435/42 |

OTHER PUBLICATIONS

M.S. Reisch, *Chemical & Engineering News*, Apr. 11, 1994; p. 12–15.

Trenton Times, Nov. 13, 1994.

Anderson, "Health Studies Indicate MTBE in Safe Gasoline Additive," *Chemical and Engineering News*, 9–18, Sep. 20, 1993.

Gilbert and Calabrese, "Development a Standard for MTBE in Drinking Water," *Regulating Drinking Water Quality*, 231–252.

Robinson, M., R.H. Bruner, and g.R. Olson, "Fourteen and ninety day oral toxicity studies of methyl tertiary butyl ether in Sprague–Dawley rates," *J. Am. Coll. Toxicol.*, 9:525–540 (1990).

American Petroleum Institute, Chemical Fate and Impact of Oxygenates in Groundwater: solubility of BTEX from Gasoline–Oxygenate Mixtures, Pub. No. 4531, 1991.

(List continued on next page.)

*Primary Examiner*—David A. Redding
(74) *Attorney, Agent, or Firm*—Synnetstvedt & Lechner LLP

(57) ABSTRACT

Disclosed is a method for monitoring the degradation of methyl tert-butyl ether in a contaminated media which contains methyl tert-butyl ether and/or which is treated under conditions which cause the degradation of methyl tert-butyl ether into 2-hydroxy isobutyric acid comprising: (A) evaluating the treated contaminated media to determine the absence or presence therein of 2-hydroxy isobutyric acid; (B) based on such evaluation, determining whether the conditions should be modified; and (C) modifying such conditions as may be necessary. Disclosed also is a method for degrading an ether comprising contacting the ether with a microorganism that is effective in oxidizing propane or isopropanol and 2-hydroxy-isobutyric acid.

6 Claims, 8 Drawing Sheets

OTHER PUBLICATIONS

Yeh, C. and Novak, J., "Anaerobic biodegradation of gasoline oxygenates in soils," *Water Environment Research*, 66(5), 744–752 (1994).

Yeh, C. and Novak, J., "The effect of hydrogen peroxide on the degradation of methyl and ethyl tert–butyl ether in soils," *Water Environment Research*, 67(5), 828–834 (1995).

US EPA publication SW846 US EPA 1986; Test methods for evaluating solid wastes, United States Env. Protection Agency Pub. No. SW846.

Brockman, F.J., W. Payne, D.J. Workman, A. Soong, S. Manley, and T.C. Hazen, "Effect of gaseous nitrogen and phosphorous injection on it situ bioremediation of a trichloroethylene–contaminated site," *J. Haz. Material*, 41:287–298 (1995).

Marley, M.D., D.J. Hazebrook, and M.t. Walsh, "The application of in situ air sparging as an innovative soils and groundwater remediation technology," *Groundwater Monitoring Review*, 2:137–145 (1992).

Lombard, K.H., J.W. Borthen and T.C. Hazen, 1994, The design and management of system components for in situ methanotrophic bioremediation of chlorinated hydrocarbons at the Savannah River Site, in : R.E. Hinchee (ed.), *Air Sparging for Site Remediation*, Lewis Publishers, Boca Raton, FL, pp. 81–96.

Hazen, T.C. et al., 1994, Summary of in situ bioremediation demonstration (methane biostimulation) via horizontal wells at the Savannah River Site Integrated Demonstration Project, in : *In Situ Remediation: Scientific Basis for Current and Future Technologies*, Battelle Press, Richland, WA, pp. 137–150.

"Removing Gasoline from Soil and Groundwater Through Air Sparging," by Michael C. Marley, *Remediation*, 121–131, Spring 1992.

"Successfully Applying Sparging Technologies," by Michael C. Marley and Edward X. Droste, *Remediation*, 55–68, Summer 1995.

Roberts, P.V., G.D. Hopkins, D.M. Mackay, and L. Semprini, "A field evaluation of in situ biodegradation of chlorinated ethanes: Part I, methodology and field site characterization," *Ground Water*, 28:591–604 (1990).

Marley, M.D., E.X. Droste, H.H. Hopkins, and C.J. Bruell, "Use Air Sparging to Remediate," *Environ. Engineer. World*, 6–14 (Mar.–Apr. 1996).

Semprini, L. and P.L. McCarty, "Comparison between model simulations and field results from in situ biorestoration of chlorinated aliphatics: Part 1, biostimulation of methanotropic bacteria," *Groundwater*, 29:365–374 (1991).

Perry, "Substrate Specificity in Hydrocarbon Utilizing Microorganisms," *Antonie van Leeuwenhoek*, 27–36 (1968).

L.P. Wackett et al., *Applied and Environmental Microbiology*, 55:2960–2964 (1989).

Hareland, W., R.L. Crawford, P.J. Chapman, and S. Dagley, 1975, "Metabolic function and properties of 4–hydroxyphenylacetic acid 1–hydroxylase from *Pseudomonas acidovorans*," *J. Bacteriol.*, 121:272–285.

Speitel, G.E., R.C. Thompson, and D. Weissman, "Biodegradable kinetics of *Methylosinus trichosporium* OB3b at low concentrations of chloroform in the presence and absence of enzyme competition by methane," *Water Res.*, 27:15–24 (1993).

Salanitro et al., "Isolation of a Bacterial Culture that Degrades Methyl t–Butyl Ether," *Applied and Environmental Microbiology*, 2593–2596 (Jul. 1994).

Burback, B.L. and Perry, J.J., *Applied and Environmental Microbiology*, 59(4), 1025–1029 (1993).

Vanderberg et al., Abstract Q–111, "Catabolism of Recalcitrant Compounds by Combined Cultures of Soil Mycobacteria," from 94th General Meeting of the Am. Soc. Microbiol., Las Vegas (1994).

Mo et al., 1995; Abstracts Ann. Meet. Am. Soc. Microbiol., Q51.

Mormile et al., "Anaerobic Biodegradation of Gasoline Oxygenates: Extrapolation of Information to Multiple Sites and Redox conditions," *Environ. Sci. Technol.*, 28:1727–1732 (1994).

Vanderberg et al., *Can. J. Microbiol.*, 40(3), 169–172 (1994).

Hamamura et al., *Appl. and Environ. Microbiol.*, 63(9), 3607–3613 (1997).

Welch, *Clin. Microbiol. Reviews*, 4(4), 422–438 (1991).

Steffan et al., *Appl. and Environ. Microbiol.*, 63(11), 4216–4222 (1997).

Cowan et al., 28th Mid–Atlantic Conference Proceedings, Technomic Publishers (Buffalo, NY, Jul. 1996) (submitted for publication).

VanSchie et al., *Appl. and Environ. Microbiol.*, 64(7), 2432–2438 (1998).

Garnier et al., Appl. Microbiol. Biotechnol., 51, 498–503 (1999).

Hanson et al., *Appl. and Environ. Microbiol.*, 65(11), 4788–4792 (1999).

Mo et al., *Appl. Microbiol. Biotechnol.*, 47, 69–72 (1997).

Salanitro et al., "Perspectives on MTBE Biodegradation and the Potential for in situ Aquifer Bioremediation," presented at Southwestern Regional Conf. of the Natl. Groundwater Assoc. (1998).

Buscheck et al., "Occurrence and Behavior of MTBE in Groundwater," p. 2–3, Natl. Groundwater Assoc. (1998).

Hardison et al., *Appl and Environ. Microbiol.*, 63(8), 3059–3067 (1997).

Squillace et al., *Environ. Sci. Technol.*, 30, 1721–1730 (1996).

Bradley et al., *Environ. Sci. Technol.*, 33, 1877–1879 (1999).

Fortin et al., *Environ. Sci. Technol.*, 33, 2987–2991 (1999).

Cowan et al., *Hazardous & Industrial Wastes*, 28, 523–530 (1996).

McClay et al., "Chloroform Mineralization By Toluene–Oxidizing Bacteria," *Appld. Environ. Microbiol.*, 62:2716–2722 (1996)).

Raag, et al., "Crystal Structure of the Carbon Monoxide–Substrate–Cytochrome P450cam Ternary Complex," *Biochemistry*, 28:7586–7592 (1989).

Miles ("Structurally and Functionally Conserved Regions of Cytochrome P–450 Reductase as Targets for DNA Amplification by the Polymerase Chain Reaction," *Biochem. J.*, 287:195–200 (1992)).

Hotze et al., "Cinnamate 4–Hydroxylase from *Catharanthus roseus*, and a Strategy for the Functional Expression of Plant Cytochrome P450 Proteins as Translational Fusions with P450 Reductase in *Escherichia coli*", *FEBS Lett.*, 374:345–350 (1995)).

Friedman et al., "Construction of a Broad Host Range Cosmid Cloning Vector and Its Use in the Genetic Analysis of Rhizobium Mutants," *Gene*, 18:289–296 (1982)).

Olsen et al. ("Development of Broad–Host–Range Vectors and Gene Banks: Self–Cloning of the *Pseudomonas aeruginosa* POA Chromosome," *J. Bacteriol.*, 150:60–69 (1982)).

Herrero et al., "Transposon Vectors Containing Non–Antibiotic Resistance Selection Markers for Cloning and Stable Chromosomal Insertion of Foreign Genes in Gram–Negative Bacteria," *J. Bacteriol.*, 172:6557–6567 (1990)).

Christie et al., "Two Conjugation Systems Associated with *Striptococcus faecalis* Plasmid pCF10: Identification of a Conjugative Transposon that Transfers Between *S. faecalis* and Bacillus subtilis, " *J. Bacteriol.*, 169:2529–2536 (1987)).

Shaw and Clewell, "Complete Nucleotide Sequence of Macrolide–Lincosamide–Streptogramin B–Resistance Transposon Tn917 in *Streptococcus faecalis,"J. Bacteriol.*, 164:782–796 (1995)).

Belisle et al. ("Isolation and Expression of a Gene Cluster Responsible for Biosynthesis of the Glycopeptidolipid Antigens of *Mycobacterium avium,*" *J. Bacteriol.*, 173:6991–6997 (1991)).

Vogt–Singer and Finnerty, Construction of an *Escherichia coli*–Rhodococcus Shuttle Vector and Plasmid Transformation in Rhodococcus spp., *J. Bacteriol*, 170:638–645 (1988)).

Mermod et al., "Vector for Regulated Expression of Cloned Genes in a Wide Range of Gram–Negative Bacteria," *J. Bacteriol.*, 167:447–454 (1986)).

DeLorenzo et al., "Mino–Tn5 Transposon Derivatives for Insertion Mutagenesis, Promotor Probing, and chromosomal Insertion of cloned DNA in Gram–Negative Eubacteria," *J. Bacteriol.*, 72:6568–6571 (1990)).

Jacobs et al. ("Genetic Systems for Mycobacteria," *Methods Enzymol.*, 204:537–555 (1991)).

Snapper SB, Melton RE, Mustafa S, Kieser T, Jacobs WR Jr *Mol Microbiol* 4(11): 1911–1919 (Nov. 1990).

Martin et al., "Transposition of an Antibiotic Resistance Element in Mycrobacteria," *Nature*, 345:739–743 (1990)).

Snapper et al., ("Lysogeny and Transformation in Mycrobcateria: Stable Expression of Foreign Genes," *Proc. Natl. Acad. Sci. USA*, 86:6987–6991 (1988)).

* cited by examiner

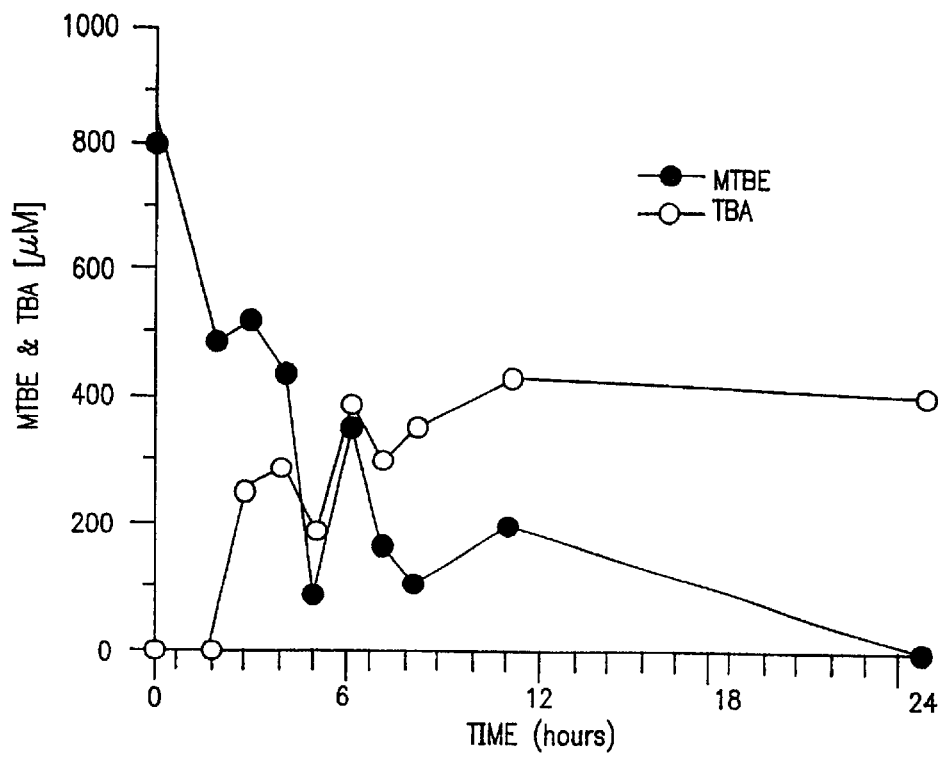
FIG. IA
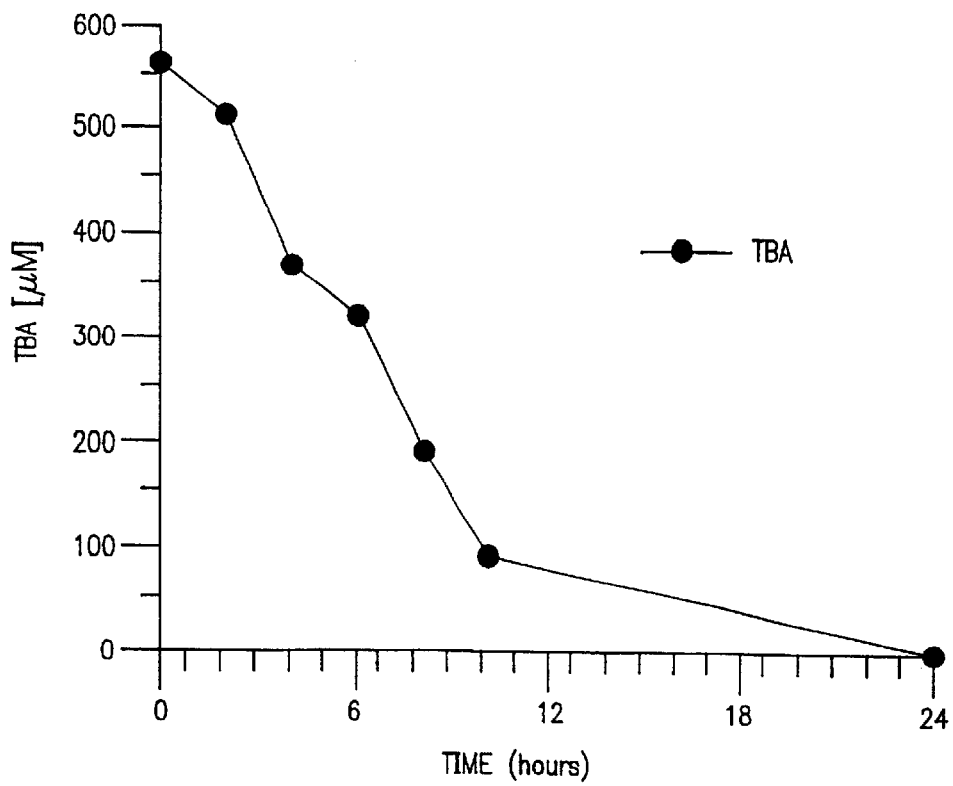
FIG. IB

BIODEGRADATION OF THE GASOLINE OXYGENATES

FIELD OF THE INVENTION

This invention relates to a method for converting undesirable environmental contaminants into environmentally acceptable materials. More particularly, the present invention relates to a biological method for converting organic compounds which are water and soil contaminants into innocuous compounds.

The field of the present invention will be described initially in connection with the contaminant methyl-tert-butyl ether (hereafter also referred to as "MTBE"). It should be understood that the present invention has applicability to the treatment of other "ether" contaminants, as will be described below.

MTBE has been used in "premium" gasoline since 1979 as a high octane additive which functions as an oxygenate. Its use has replaced lead and other additives such as benzene, toluene, ethylbenzene and xylenes, which are often referred to as "BTEX" and which are considered highly contaminating materials. More recently, for areas of the country with relatively high air pollution, the 1990 Clean Air Act requires that oxygenates be used in all grades of gasoline to reduce vehicle emissions which constitute air toxics, for example, carbon monoxide and volatile organic compounds (VOCs). Oxygenates cause fuel to burn more cleanly, reducing the amounts of ozone, carbon monoxide, toxics and other pollutants present in vehicle emissions. The current goal of gasoline reformulation is to reduce gasoline's benzene content by 33% and other contaminating organics by at least 15%.

MTBE is the most widely used oxygenate in the United States. In 1992, more than 1.8 billion gallons of MTBE was used in gasoline. Its use has continued to increase each year since 1992 (Anderson, "Health Studies Indicate MTBE is a Safe Gasoline Additive," *Chemical and Engineering News*, Sep. 20, 1993). MTBE producers have invested billions of dollars into plants already in operation or planned. More than 29 companies now produce MTBE in the U.S. And in 1993, production of MTBE exceeded 24 billion gallons, making it second on the list of organic chemicals produced in the U.S. (M. S. Reisch, *Chemical & Engineering News*, Apr. 11, 1994; p. 12–15).

The toxicity of MTBE is still in question. A recent Italian study suggested that MTBE poses a significant cancer risk (Trenton Times, Nov. 13, 1994). Other studies have suggested that MTBE is not very toxic to humans (Anderson, "Health Studies Indicate MTBE is Safe Gasoline Additive," *Chemical and Engineering News*, 9–18, Sep. 20, 1993).

Without regard to whether MTBE is or is not toxic, it is a fact that as an ether, it has relatively low odor and taste thresholds compared to other organic compounds. MTBE's odor threshold in water is about 45 to about 95 ppb. Its taste threshold in water is about 134 ppb (American Petroleum Institute 1993). This means that MTBE can be detected in drinking water through odor and taste at relatively low concentrations. The Maximum Drinking Water Levels for MTBE are between 540 and 700 ppb (Gilbert and Calabrese, "Developing a Standard for MTBE in Drinking Water," *Regulating Drinking Water Quality*, 231–252). Based on rat model studies, the no-observable-adverse-effect-level (NOAEL) is 100 mg/kg/day (Robinson, M., R. H. Bruner, and G. R. Olson, "Fourteen and ninety day oral toxicity studies of methyl tertiary butyl ether in Sprague-Dawley rats," *J. Am. Coll. Toxicol.*, 9:525–540 (1990)).

The greatest human exposure routes of MTBE are through drinking contaminated water, use of the water in cooking, and inhalation during bathing.

The chances of such exposure are not insignificant since vast amounts of MTBE-containing gasoline are stored in underground storage tanks, including tanks which leak. Seepage of MTBE from leaky tanks into groundwater and spillage of MTBE during tank filling operations and transfer operations at distribution terminals have led to considerable contamination of groundwater near these tanks. Because MTBE is highly soluble in water (43,000 ppm), it is now often found as plumes in groundwater near service stations, related storage facilities and filling terminals throughout the United States (American Petroleum Institute, Chemical Fate and Impact of Oxygenates in Groundwater: "Solubility of BTEX from Gasoline-Oxygenate Mixtures," Pub. No. 4531, 1991). A market survey by The Jennings Group (1993) estimated that there are greater than 234,000 federally regulated contaminated underground storage tank (UST) sites in the United States and greater than 42,000 hazardous sites.

The recalcitrance of MTBE relative to other gasoline components makes it particularly resistant to inexpensive biological treatment approaches such as bioventing or biosparging. Conversion or "remediation" of the contaminated media to innocuous, environmentally-acceptable compounds, therefore, has been particularly difficult. Furthermore, MTBE can be difficult to air strip from ground water and trap on activated carbon, thereby limiting air sparging/soil vapor extraction (AS/SVE) approaches to remediation. In a recent study of 15 sites, stripping efficiencies of as low as 56% were observed (American Petroleum Institute, supra). And yet this method has been deemed to be the most effective method for remediating contaminated groundwater.

There are other ether-based compounds that are also widely used and that are considered contaminants. Examples of such ether-based compounds include cycloaliphatic compounds, for example, tetrahydrofuran, a widely used solvent. Examples of other aliphatic ethers which are considered contaminants are ethyl-tert-butyl ether ("ETBE"), tert-amyl methyl ether ("TAME") and diisopropyl ether ("DIPE"), which are used as gasoline oxygenates.

As production of such ether-based compounds continues to grow, it can be expected that the incidence and severity of spills will increase and that the threat to the water supply will become more severe. The present invention is related to the biological treatment of ether compounds to counter such a threat by providing means to efficiently remediate contaminated sites.

Reported Developments

It appears that relatively little work has been done to develop means for biodegrading ethers of the aforementioned type. In one study, an aerobic consortia isolated from acclimated sludge was maintained on MTBE which served as the sole source of carbon for the consortia (Salanitro et al., "Isolation of a Bacterial Culture that Degrades Methyl t-Butyl Ether," *Applied and Environmental Microbiology*, July 1994). MTBE was degraded to tertiary-butyl alcohol ("TBA") which was also degraded by the enrichment culture. The consortia is described as comprising at least 6 different uncharacterized bacteria. The physiology of the individual organisms is not reported. It is reported that the consortia appear to have a significant population of nitrifying bacteria.

Another recent study reported on the isolation from soil and sludge of several aerobic organisms that were able to degrade MTBE (Mo et al. 1995; Abstracts Ann. Meet. Am. Soc. Microbiol., Q51), but the degradation was relatively slow and inefficient, and the characteristics of the degradative organisms were not reported.

It appears that in situ degradation of MTBE in aquifers also has not been studied extensively. However, recent unpublished studies by researchers at Mobile Oil Corporation have provided evidence, based on historical concentrations of MTBE in groundwater, that natural attenuation of MTBE may occur over very long periods of time in aquifers. Apparent degradation occurs after the concentrations of benzene, toluene, ethylbenzene or xylene (BTEX) are reduced to low levels. The identity of the organisms responsible for the decline in MTBE were not reported. In further studies, it was observed that MTBE was partially transformed in only one of several anaerobic sediment samples tested (Mormile et al. "Anaerobic Biodegradation of Gasoline Oxygenates: Extrapolation of Information to Multiple Sites and Redox Conditions," *Environ. Sci. Technol.*, 28:1727–1732, 1994). Transformation of MTBE in the one active sample required more than 152 days of incubation, resulted in only about 50% transformation of MTBE, and produced nearly stoichiometric amounts of TBA as a terminal product. It was reported also that MTBE was not degraded by resting cells of two anaerobic bacteria, *Acetobacterium woodii* and *Eubacterium limosum*, which, however, were effective in degrading several un-branched ethers. The authors of the study concluded that MTBE was recalcitrant to both aerobic and anaerobic biodegradation.

In view of the state of the art, it is clear that there is a need for technology that will provide the means for a rapid, efficient and cost effective process for converting MTBE and other environmentally undesirable ether-based compounds into environmentally acceptable compounds.

SUMMARY OF THE INVENTION

In accordance with the present invention, there is provided a method for degrading an ether comprising contacting said ether with a propane-oxidizing microorganism or with an isopropanol-oxidizing microorganism.

Examples of preferred species of a propane-oxidizing microorganism are *Mycobacterium vaccae* JOB5, ATCC 29678; Strain ENV420; Strain ENV421; and Strain ENV425.

Also, in accordance with the present invention, a co-substrate is utilized with the microorganism to increase the cell population thereof. For this purpose, the microorganism is grown on co-substrates constituting materials such as, for example, ethanol, acetone, butane, isopropanol and typical bacterial growth substrates, for example, Lauria broth.

Another aspect of the present invention includes degrading the ether by contacting it with the microorganism in a bioreactor, for example, a suspended growth bioreactor, such as a membrane bioreactor, a stirred-tank reactor, or a fixed-film bioreactor.

Still another aspect of the present invention includes degrading the ether with the microorganism in situ.

The degradation of ethers in accordance with the present invention can result in the formation of alcohols which are also degraded by the microorganism. Accordingly, the present invention also comprises degrading an alcohol by contacting it with a propane-oxidizing microorganism or with an isopropanol-oxidizing microorganism. For example, the microorganism can convert tert-butyl ether into tert-butyl alcohol (TBA), which is also degraded by the microorganism. The TBA is in turn degraded to carbon dioxide and water.

The present invention provides means for degrading an ether, for example, tert-butyl ethers and/or tert-butyl alcohols efficiently and economically. It can be used to completely degrade these compounds to innocuous compounds, such as $CO_2$ and water. In contrast, the use of prior art techniques result in undesirable degradation products which require further treatment, such as air- or steam-stripping, use of adsorbents such as activated carbon, and large expenditures of energy to burn the contaminant and the associated media.

Still yet another aspect of the present invention is based on the discovery of the MTBE degradation pathway. Based on this discovery, there is provided a method for monitoring the degradation of methyl-tert-butyl ether in a contaminated media which contains methyl-tert-butyl ether and which is treated under conditions which cause the degradation of methyl-tert-butyl ether into degradative intermediates comprising: (A) evaluating the treated contaminated media to determine the absence or presence therein of one or more of said degradative intermediates; (B) based on such evaluation, determining whether said conditions should be modified; and (C) modifying such conditions as may be necessary. In one embodiment of this aspect of the present invention, the contaminated media is evaluated for the absence or presence of the degradative intermediate 2-hydroxy isobutyric acid. In another embodiment, the contaminated media is evaluated for the absence or presence of the degradative intermediate tert-butyl alcohol. In yet another embodiment, the contaminated media is evaluated for the absence or presence of a degradative intermediate selected from the group consisting of 2-methyl-2-hydroxy-1-propanol, 2-propanol, acetone, and hydroxyacetone.

One more aspect of the present invention comprises a method for degrading an ether comprising contacting the ether with a microorganism that is effective in oxidizing propane or isopropanol and 2-hydroxy-isobutyric acid. In one embodiment of this aspect of the present invention, the ether is contacted with a propane- or isopropanol-oxidizing microorganism which has been modified genetically to contain genes encoding enzymes which are effective in oxidizing 2-hydroxy isobutyric acid. In another embodiment, the ether is contacted with a 2-hydroxy isobutyric acid-oxidizing microorganism which has been modified genetically to contain genes encoding enzymes which are effective in oxidizing propane or isopropanol. In yet another embodiment, the ether is contacted with a microorganism which has been modified genetically to contain genes encoding enzymes which are effective in oxidizing propane or isopropanol and genes encoding enzymes which are effective in oxidizing 2-hydroxy isobutyric acid.

In yet another aspect of the present invention, a method is provided for degrading an ether comprising contacting the ether with a propane- or isopropanol-oxidizing microorganism and a microorganism which is effective in oxidizing 2-hydroxy isobutyric acid.

Advantages which are realized by the provision of the monitoring aspects of the present invention are that it enables the monitor to determine the extent to which the desired degradation is being effected and to implement procedures, as may be necessary, to optimize or at least improve the rate of degradation, including, for example, effecting degradation utilizing a microorganism that is effective in degrading 2-hydroxy isobutyric acid.

Other advantages of the present invention will become apparent from a consideration of the following detailed description of the invention.

BRIEF DESCRIPTION OF THE DRAWINGS

FIG. 1a is a graph which shows the degradation of MTBE by propane-grown *Mycobacterium vaccae* JOB5. FIG. 1b is a graph which shows the degradation of TBA by propane-grown Mycobacterium JOB5.

DETAILED DESCRIPTION OF THE INVENTION

Figure 2:
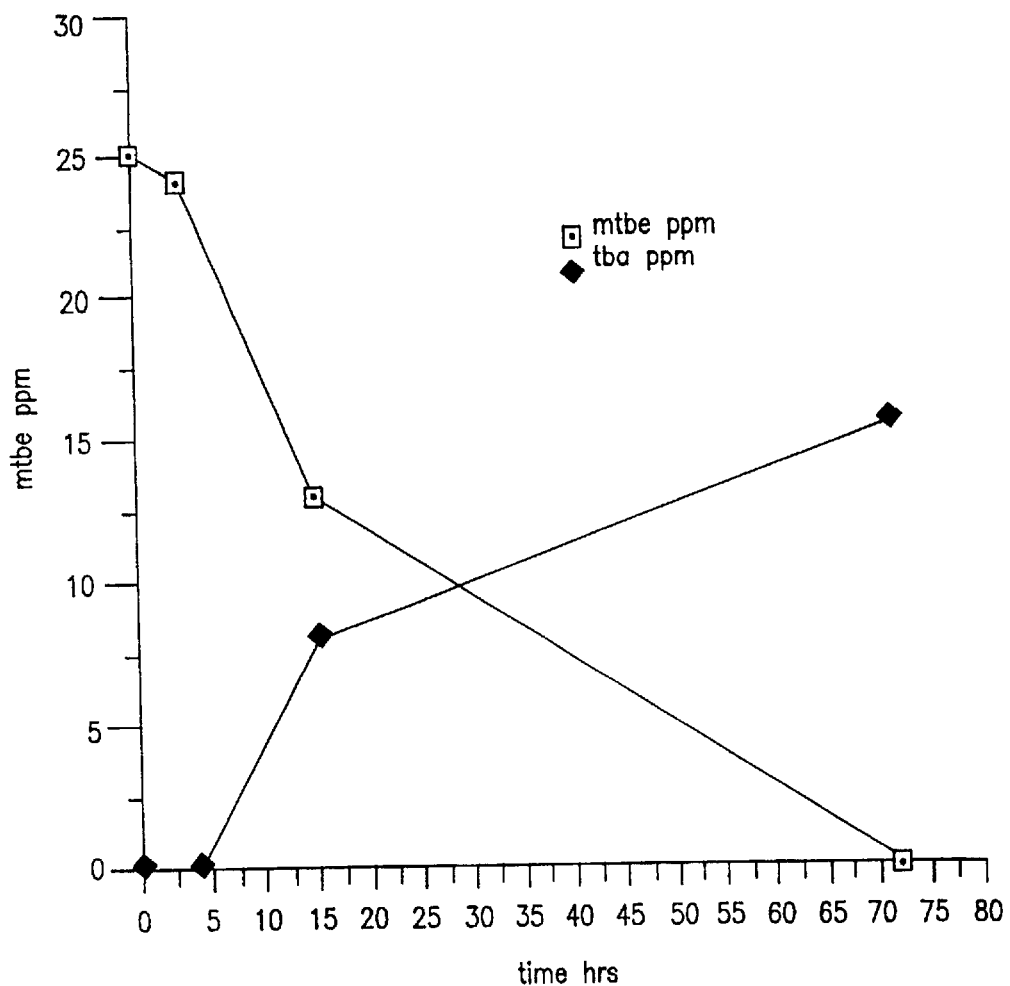
FIG. 2 is a graph which shows the degradation of MTBE by strain ENV425 after growth on ethanol.

The present invention involves the discovery that bacteria capable of oxidizing propane or isopropanol are capable of degrading various types of undesirable ether-based environmental contaminants (also referred to herein as an "ether"). The ether may be aromatic or aliphatic, for example, a cyclic, a straight-chain or a branched-chain ether. Particularly good results have been achieved with ethers that have in their structure a tertiary carbon atom, that is, a carbon atom which does not have a hydrogen atom bonded to it. The tertiary carbon atom is completely substituted, for example, with alkyl groups, including, for example, lower alkyl groups, that is, alkyl groups having 1 to about 5 carbon atoms.

Examples of such ether-based environmental contaminants are compounds used as gasoline oxygenates or solvents, in particular, tertiary alkyl ethers, such as the gasoline oxygenates methyl tert-butyl ether ("MTBE"), ethyl tert-butyl ether ("ETBE") and methyl tert-amyl ether ("MTAE", but referred to commonly as "TAME"). Other types of ether-based compounds which can be treated in accordance with the present invention include saturated cyclic ethers, such as tetrahydrofuran, a material which is widely used in solvents and in chemical bulk products. A mixture of two or more ethers can also be treated in accordance with the present invention. Such ethers can be completely degraded by propane- or isopropanol-oxidizing bacteria.

The present invention involves, additionally, the discovery that degradation products of ethers which are treated in accordance with the present invention and which include —OH groups, can also be degraded utilizing the bacteria described herein. Tert-butyl alcohols ("TBA") are examples of such materials. In general, the present invention is effective in degrading an ether completely to carbon dioxide and water and such degradation can be effected through an intermediate compound, for example, an alcohol.

It is believed that the present invention will be used widely to degrade MTBE which is by far the most common compound used as a gasoline oxygenate. MTBE is a volatile, flammable, colorless liquid at room temperature and has a terpene-like odor. It is miscible in gasoline and is soluble in water, alcohol and other ethers.

A wide variety of materials in which the ether is present may be remediated or decontaminated in accordance with the present invention. Examples of such materials include soils, sludges, sediments, dredge tailings, contaminated gasses, chemical waste and the like. It is believed that the most widely used application of the present invention will involve the treatment of contaminated water, in particular, contaminated groundwater present in urban aquifers and wells.

Methods for determining if a given media is contaminated are well known in the art and include gas and liquid chromatography. For example, MTBE can be detected by gas chromatography according to the EPA method 8260B as described in US EPA publication SW846 US EPA 1986; Test methods for evaluating solid wastes, United States Env. Protection Agency Pub. No. SW 846. Other methods for detecting contamination, such as high performance liquid chromatography (HPLC) may be used, if desired.

The desired extent to which the contaminated material is decontaminated of the ether will usually be defined on a site-specific and material-specific basis. The level of remediation performed at a given site will depend on the intended or actual use of the material contaminated. In most situations, it is desirable to lower the concentration of the ether-based environmental contaminant to levels as low as possible. For example, in treating contaminated water, it would be desirable to reduce the ether-based contaminant concentration to below a level at which the ether is detectable by odor and taste. Thus, in situations where MTBE is present in water that may be used for cooking, drinking or bathing, it would be desirable to lower the level of MTBE to at least below the maximum drinking water level of between 540 and 700 ppb. Lower levels can be achieved, for example, to levels below MTBE's average taste threshold of about 134 ppb, and even below MTBE's odor threshold in water of 45–95 ppb.

Many states have their own standards on the level of contamination that is acceptable in groundwater. In general, the levels of allowable contamination in groundwater are set at about 70 to about 700 ppb. The present invention is capable of being used to degrade the ether-based contaminants to levels at least below current environmental standards.

Microorganisms for use in the practice of the present invention include a propane-oxidizing or an isopropanol-oxidizing microorganism or a mixture of these microorganisms. A method for identification of strains of propane-oxidizing or isopropanol-oxidizing microorganisms capable of degrading ethers is described below in Examples 1, 2 and 3 of the present application.

Propane-oxidizing bacteria that produce a propane monooxygenase ("PMO") enzyme are known to be able to oxidize a variety of substrates including, propane, trichloroethylene, and hydrochlorofluorocarbons (see respectively: Perry, "Substrate Specificity in Hydrocarbon Utilizing Microorganisms," Antonie van Leeuwenhoek, 27–36 (1968); L. P. Wackett et al., *Applied and Environmental Microbiology* 55:2960–2964 (1989); and Envirogen Inc. (the assignee hereof, unpublished results). The initial oxidation of the substrates is facilitated by PMO which incorporates a single oxygen atom into the substrate molecule.

Propane-oxidizing bacteria for use in accordance with the present invention include species that produce PMO. It is believed that PMO is the enzyme primarily responsible for degradation of the tertiary butyl ethers, tertiary butyl alcohols and tetrahydrofuran. Accordingly, microorganisms which possess the gene for propane monooxygenase can be used in the practice of the present invention. It is anticipated that microorganisms which are genetically engineered to possess the PMO gene can be used also in the practice of the present invention.

In preferred embodiments of the present invention, the propane-oxidizing microorganisms *Mycobacterium vaccae* JOB5, ENV420, ENV421or ENV425 are used to degrade ethers, including tertiary butyl ethers, for example, MTBE.

*Mycobacterium vaccae* JOB5 is a known bacteria that is available to the public (ATCC identification number 29678).

Developmental work associated with the present invention has included isolation of the three bacterial strains, namely, ENV420, ENV421 and ENV425.

The strain ENV425 was deposited with the ATCC on Jul. 2, 1996. This microorganism is available to the public in accordance with the terms of the Budapest Treaty. ENV425 is a gram-positive, acid-fast filamentous organism that forms red to orange colonies on BSM or rich media and has been identified by fatty acid analysis to be a member of the genus Nocardia.

Strain ENV420 is also a gram-positive acid-fast filamentous organism. Although similar to Nocardioform bacteria, its fatty acid profile is not a good match with any bacteria present in currently available fatty acid reference databases.

ENV421, like ENV420, appears to be a Nocardioform bacteria whose fatty acid profile does not match any other in currently available fatty acid databases.

The present invention includes within its scope the use of mutagenesis to improve the ability of the microorganisms to degrade a given contaminant or to survive in a given contaminated medium. Standard bacterial mutagenesis techniques known in the art may be employed to mutagenize the bacteria. Alternatively, the bacteria may be modified using genetic engineering to add or delete given genes that effect the bacteria's ability to degrade a given contaminant.

The present invention includes also within its scope the use of one or more other microorganisms in combination with one or more of the microorganisms described herein to achieve complementary degradation against a mixture of contaminants which includes an ether, for example, in the treatment of mixed waste streams. Such a combination utilizes the different degradative specificities of the involved microorganisms. Accordingly, for certain applications, a given contaminated medium may be treated with microorganisms having different specificities for given contaminants or their degradative intermediates.

In applications in which the contaminated site comprises mainly one or more ethers, satisfactory results can be achieved utilizing microorganisms that comprise approximately 100% of propane-oxidizing or isopropanol-oxidizing microorganisms or a mixture thereof. Accordingly, a pure culture of a propane-oxidizing or isopropanol-oxidizing microorganism can be introduced to the contaminated media for remediation. Alternatively, other microorganisms capable of degrading the contaminant or its degradative by-products can be used. In some instances, the growth of such other microorganisms may be aided by the presence of the propane-oxidizing or isopropanol-oxidizing microorganisms which are introduced as a pure culture. For most applications involving mainly an ether contaminant, it is recommended that the propane- or isopropanol-oxidizing microorganisms comprise at least a majority of the degradative microorganisms initially present during remediation. Thus, propane-oxidizing and/or isopropanol-oxidizing microorganisms will constitute greater than 50% of the microorganisms which are present in the contaminated media and which are capable of participating in the degradation of the contaminant(s).

Any suitable carbon source and suitable conditions can be used to increase the cell population of the involved microorganisms. Such increase is referred to herein as "growth of the microorganisms" and materials for use in effecting the growth are often accompanied by use of the term "grown on". For example, the propane-oxidizing and the isopropanol-oxidizing bacteria may be grown on propane and isopropanol, respectively. Such compounds can serve as the exclusive source of carbon for the microorganism.

There are applications in which it can be advantageous to use other materials to grow the propane-oxidizing microorganisms and/or the isopropanol-oxidizing microorganism. In this connection, it is noted that propane is a flammable gas. For certain applications, it may be more convenient and practical to use a liquid carbon source, instead of propane, for growing the propane-oxidizing microorganism. Examples of liquid carbon sources for such microorganisms are isopropanol, acetone, and ethanol. On the other hand, another example of a gas which may be used as the carbon source is butane.

Conventional bacterial growth media can also be used to effect an increase in cell population. Examples of such growth media are: Lauria broth (Gibco/BRL); Trypticase soy agar (BBL; Bectin/Dickinson, Cockysville, Md.); R2A (Difco Laboratories, Detroit, Mich.); and nutrient broths, including casamino acids and/or yeast extract.

Once the cell population has reached a desirable level, it may be desirable to transfer the cells to a growth media which promotes expression of the genes responsible for degradation of the contaminant. For example, as mentioned above, it is believed that propane monooxygenase ("PMO") is primarily responsible for the degradation of ether-based contaminants. To promote the expression of the PMO gene, there can be used a growth medium comprising basal salts (minimum) and either propane and/or isopropanol as an inducer of the propane monooxygenase gene and as a carbon source. If desired, the techniques of molecular biology may be used to screen for compounds which induce expression of the PMO gene.

Growth of the bacteria can be effected in a bioreactor or in situ and can be enhanced by the addition of growth substrates which are more readily metabolized by the microorganisms.

A media which is contaminated with an ether-based compound and/or the degradation products of these ethers can be contacted with propane- or isopropanol-oxidizing bacteria either at the site of contamination or by transferring the contaminated media to a bioreactor for remediation off-site.

A variety of bioreactors known to those of skill in the art may be used in the practice of the present invention. Suspended growth reactors, such as membrane bioreactors, standard continuously stirred tank reactors (CSTRs) and activated sludge systems may be used in the practice of the invention. Alternatively, and because bacteria adhere strongly to surfaces, fixed film reactors, such as fluidized bed reactors or fixed support reactors, may also be used, if desired.

It is believed that a suspended growth reactor, in particular, a membrane bioreactor, will be particularly efficient. An example of a membrane bioreactor is presented in FIG. 7. The membrane bioreactor system consists of a tank or reactor vessel 10 equipped with a variable speed mixer, an air diffuser, an automated pH controller and nutrient 12 and acid/caustic feed 14 systems. Groundwater 15 or other contaminated liquid media is introduced from an equalization tank 16 via a reactor feed pump 18. If desired, filtered dilution water 17 may be added to the equalization tank. Effluent from the reactor vessel 10 is passed through membrane filters 20 which retain the microorganisms present in the reactor vessel 10 but allow the effluent containing the degradation products of the ether to pass.

Effluent from the bioreactor may be sent to a proof tank 22 which is used to hold the effluent so that it can be analyzed before passing the effluent along to a holding tank 24 and subsequently discharging into the sewer system 28.

Soda ash, caustic solutions containing, for example, NaOH or KOH, or acids may be used to control pH and soluble fertilizer may be used to supply nutrients to the microorganisms. In preferred embodiments, the fertilizer or other nutrient source supplies nutrients at a ratio of about 100 parts carbon to about 10 parts nitrogen to about 1 part phosphate (100:10:1). Examples of fertilizer acceptable in the practice of the present invention include fish oil emulsion or any other soluble agricultural fertilizer, such as Agway 20-20-20 or Lesco 19-19-19, ammonium chloride or ammonium nitrate-based fertilizers and potassium or sodium phosphate-based fertilizers. The liquid level in the reactor may be controlled by equipment available in the art designed to maintain reactor liquid volume.

When a membrane bioreactor is used, effluent from the reactor may be passed over ultrafiltration membranes or other filtration apparatus. An example of an ultrafiltration membrane useful in the practice of the invention is Rhone-Poulenc Model SC37/K09.

Operation of the bioreactor will usually have two phases: an initial batch operation and then continuous operation. Batch operation is used to produce large amounts of degradative biomass within the reactor system, and to acclimate the degradative organisms to the contaminant feed. The following description is illustrative of an operation involving the use of a propane-oxidizing bacteria.

Batch operation can be initiated by inoculating the reactor with the propane-oxidizing microorganism and then adding isopropanol, for example, to a final concentration of from 0.1 to 1% (v/v). The organisms are aerated and allowed to grow until no isopropanol remains in the culture medium. Additional isopropanol can then be added to further increase biomass levels. After sufficient biomass is obtained, a small amount of contaminant (e.g., MTBE) can be added to acclimate the organisms. Additional contaminant can be added after depletion of the prior addition. When sufficient degradation rates are achieved, the reactor can be operated in a continuous mode.

Preferably, during continuous and batch operation, the reactor should be operated at a temperature of between 25 and 37° C., with the pH in the range of 6.8 to 7.2, and a dissolved oxygen concentration >5 mg/L. Hydraulic retention time within the reactor should be adjusted to allow sufficient time for degradation of the target compound to below treatment standards. During field and laboratory testing, a hydraulic retention time of 2.5 to 3.3 days was sufficient to degrade >90% of influent MTBE. Furthermore, the volatile suspended solids (biomass) concentration should be maintained at a relatively high concentration, preferably from 1,000 to 30,000 mg/l depending on the contaminant loading rate.

In certain circumstances, it may be more convenient or economical to treat a contaminated site in place (in situ). The following description is illustrative of an operation involving the degradation of gasoline oxygenates.

Most environmental contamination by gasoline oxygenates occurs in the subsurface—either in the unsaturated (vadose) or saturated zones of soils. Gasses can be added readily to the subsurface either by injection/vapor extraction (vadose zone) or by in situ gas sparging (saturated zone) (Marley, M. C., E. X. Droste, H. H. Hopkins, and C. J. Bruell, 1996, Use Air Sparging to Remediate, *Environ. Engineer. World,* March–April 1996, 6–14). When the techniques are used to stimulate the growth and activity of natural pollutant degrading microorganisms, they are referred to "bioventing" and "biosparging", respectively, and "biostimulation" collectively. It is, therefore, possible to perform in situ remediation of gasoline oxygenates by injecting gaseous co-substrates (e.g., propane or butane and air) into the subsurface to stimulate biodegradation of gasoline oxygenates by naturally-occurring propane and/or butane oxidizing bacteria. The use of gas (methane) injection to remediate aquifers contaminated with trichloroethylene has been demonstrated. See, for example: (A) Lombard, K. H., J. W. Borthen and T. C. Hazen, 1994, The design and management of system components for in situ methanotrophic bioremediation of chlorinated hydrocarbons at the Savannah River Site, in: R. E. Hinchee (ed.), *Air Sparging for Site Remediation,* Lewis Publishers, Boca Raton, Fla., pp. 81–96; and (B) Hazen, T. C. et al., 1994, Summary of in situ bioremediation demonstration (methane biostimulation) via horizontal wells at the Savannah River Site Integrated Demonstration Project, in: *In Situ Remediation: Scientific Basis for Current and Future Technologies,* Battelle Press, Richland, Wash., pp. 137–150.

In a standard air sparging method, clean air is injected into an aquifer beneath the water table. Volatile organic components dissolved in the groundwater are forced into the vapor phase due to mass transfer. The contaminated vapors migrate from the saturated portions of the aquifer to the unsaturated or "vadose" zone above the water table. Migration of the organic vapors from the aquifer to the vadose zone may be controlled by soil vapor extraction (SVE) techniques. SVE usually employs vacuum pumps located at the surface connected to vapor extraction wells which pass through the vadose zone and which draw the contaminated vapors to the surface. The extracted vapors are then treated using a variety of ex situ treatments schemes including carbon absorption, catalytic oxidation, biofiltration or condensation.

The techniques of in situ air sparging can readily be adapted to the treatment of an area contaminated with an ether-based compound, such as MTBE. In particular, rather than injecting clean air, a gas, such as propane, can be added readily to the subsurface either by injection/vapor extraction (vadose zone) or by in situ gas sparging (unsaturated zone). Injection/vapor extraction is effective in treating the vadose (unsaturated) zone of the subsurface, and relies on gaseous diffusion of added substrates (e.g., propane and air) through the unsaturated soils. Soil vapor extraction is used to direct the flow of the added gasses, and to remove and capture any volatile contaminant. In many cases, depending on the composition of the soils, this method allows treatment of large areas of contaminated soils at a low cost. In situ gas sparging involves injecting gaseous substrates (e.g., propane and air) directly into the saturated zone of the subsurface.

This process facilitates the dissolution of the substrates into the aqueous phase of the aquifer, thereby allowing indigenous or added organisms to use the substrates as a source of energy for growth and degradation.

Vapor extraction can be coupled with in situ sparging to capture gasses which do not completely dissolve into the aqueous phase. In effect, injection/vapor extraction allows remediation of the unsaturated zone of the subsurface by stimulating degradative organisms in the unsaturated soil, whereas in situ sparging allows remediation of the saturated zone of the subsurface by stimulating organisms in the aqueous phase of the aquifers or attached to the saturated soils. Accordingly, in situ remediation of a given ether-based contaminant, such as MTBE, may be accomplished by injecting gaseous co-substrates, such as propane or butane and air into the subsurface to stimulate the biodegradation of the ether by naturally-occurring propane and/or butane oxidizing bacteria.

Alternatively, the microorganisms disclosed in the present invention may be added in situ at the site of the contamination, followed by the provision of propane or butane and air to stimulate the growth and activity of these introduced microorganisms.

Typically, microorganisms which are to be used for in situ remediation are cultured, that is, grown in fermentors to high cell density ($>1\times10^{10}$) under conditions that induce production of degradative genes (e.g., in the presence of propane). The organisms can then be concentrated by centrifugation or ultrafiltration, or they can be shipped directly to location of injection. Alternatively, cultures of the organisms can be grown directly on site and injected batch-wise or continuously into the contaminated media. The microorganisms can be diluted prior to injection, or injected in a concentrated form. Ideally, the final concentration of the organisms in the contaminated media will be from about $1\times10^7$ to about $1\times10^9$ cells/ml (gm) of contaminated media. Alternatively, the organisms can be injected at a lower initial concentration (e.g., $1\times10^5$ cells/ml) and additional growth substrate can be added to promote growth of the organisms within the contaminated media.

Injection of the organisms can be achieved by adding the organisms to an injection well composed of suitable pipe screened in the desired injection zone, or into a re-injection stream of water removed from one location of the aquifer and re-injected into another area. The microorganisms can also be injected in an air or fluid stream used to facilitate fracturing of consolidated aquifer materials by processes known in the art, such as pneumatic or hydraulic fracturing, respectively.

To perform in situ bioremediation, a preferred system involves use of small diameter wells of approximately 1 to about 4 inches in diameter which are drilled at the site of the contamination, with the bottom portion of the well located several feet below the water table. The injection rates of the desired gas will vary depending on the type of gas and the nature of the soil or other media surrounding the well. However, in general, a gas flow rate of a few cubic feet per minute, preferably greater than about 10 to about 15 CFU/min is utilized. When injecting a given gas into a saturated aquifer, sufficient pressure will be required to overcome the sum of the hydrostatic pressure of the overlying groundwater in the air and entry pressure of the underground soil or sediment formation.

Guidance on the parameters for determining the appropriate flow rates for inducing a gas in an air sparging system and construction of air sparging systems may be found in a variety of publications, including, "Use of Air Sparging to Remediate," by M. C. Marley et al., *Environmental Engineering World,* March–April 1996; "Removing Gasoline from Soil and Groundwater Through Air Sparging," by Michael C. Marley, *Remediation,* Spring 1992; and "Successfully Applying Sparging Technologies," by Michael C. Marley and Edward X. Droste, *Remediation,* Summer 1995. The information in these publications may be adapted for use in the present invention by replacing air with the desired gas, such as propane. In the case of the propane-oxidizing bacteria which have been found to be useful in the practice of the present invention, air, oxygen, propane and/or butane may be injected into the subsurface by inserting the injection wells into either the vadose or saturated zones. Vapor extraction wells can then be inserted into the vadose zone to capture the gases and direct the flow of gas within the subsurface. Co-substrates such as propane and/or butane and air oxygen can be injected simultaneously or by pulsing in one co-substrate followed by another. As an example, propane or butane can be injected for 4 hours, followed by injection of oxygen for 4 hours.

The concentration of MTBE or other contaminant in the contaminated zone can be monitored by analyzing the gas recovered in the vapor extraction system or by monitoring liquid phase concentrations of the contaminant in the groundwater. Quantification of the increase in numbers of oxidizing bacteria may be monitored by recovering soil or water samples from the subsurface and spreading samples on the surface of BSM agar plates. Plates are incubated in a sealed jar containing an atmosphere of the gaseous growth medium and air. Colonies of oxidizing bacteria are enumerated by counting the colonies that form on the plates.

Figure 8:
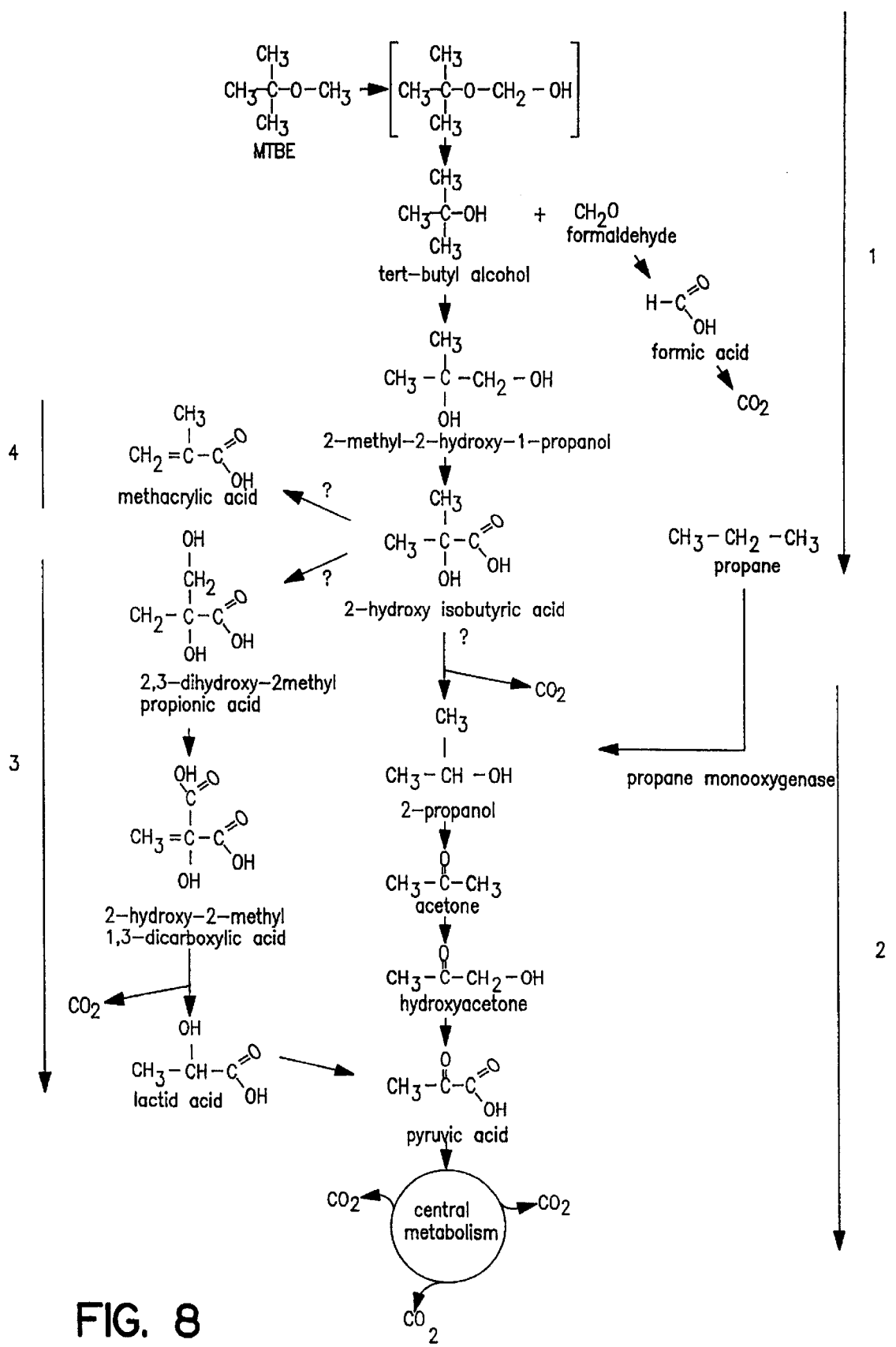
FIG. 8 presents the pathway of degradation of MTBE by propane-grown strain ENV 425.

Referring now to FIG. 8, the present invention involves also the identification of key intermediates which are produced in the course of MTBE biodegradation and which can be monitored to evaluate the rates of intrinsic bioremediation of MTBE in contaminated media, for example, aquifers or in vessels containing MTBE-contaminated media. It has been found that both TBA and 2-hydroxy isobutyric acid (HIBA) accumulate during the aerobic biodegradation of MTBE (see FIG. 8, pathway 1). The exact pathway of HIBA oxidation is not yet known, but based upon the observation that >65% of added [$^{14}$C]MTBE is converted to $^{14}CO_2$, it is believed that the tertiary backbone of MTBE is mineralized. FIG. 8 includes schematics of three possible routes (pathways 2, 3, and 4) for the degradation of HIBA. Growth studies have revealed that strain ENV425 does not grow well on HIBA; however, growth on "pathway 2" intermediates, 2-propanol, acetone, hydroxyacetone, and acetic acid, does occur. Likewise, studies have shown that ENV425 grows on pathway 3 intermediates, namely 2,3-dihydroxy-2-methyl propionic acid and lactic acid, and on pathway 4 intermediate methacrylic acid.

Intermediates that can be used as indicators of MTBE bioremediation are TBA and HIBA. Other degradative intermediates that are formed during the degradation may also be used to monitor MTBE degradation, as explained below.

In a first step, the contaminated media is evaluated to determine the absence or presence therein of intermediates in the degradation pathway. For example, the evaluation can involve instrumental analysis of a sample taken from the contaminated site. Identification of the presence of the degradative intermediate(s) may be performed by a variety of assays known in the art, including, for example, gas and liquid chromatography. Exemplary analytical instrumentation that can be used for analysis of the organic compounds which comprise the degradative intermediates includes gas chromatography systems with electron capture detector (ECD), flame ionization detectors (FID) or photoionization detectors (PID). The photoionization detectors may be configured in series with either the ECD or FID detectors to provide for more complete analysis of compounds. Gas chromatography systems utilizing a mass spectrophotometer (GC/MS) or HPLC systems may also be used for detection.

In preferred embodiments, samples taken from a contaminated media are tested for the presence of HIBA or TBA. In addition, other intermediates in the degradation pathway presented in FIG. 8, such as 2-methyl-2-hydroxy-1-propanol, may be used as indicators of degradation. Other parameters relating to the environment in the contaminated media, such as dissolved oxygen, nitrate, nitrite, FeI and FeIII, and sulfate, can be monitored also at a contaminated site to obtain an overall view of conditions in the contaminated media. The data obtained from the analysis may be used in conjunction with commercially available software designed to evaluate intrinsic bioremediation, such as BioplumeII, BioScreen and Modflow/BioMod.

Based on the evaluation, a determination can be made as to whether the conditions of the treatment should be modified. In particular, if degradative intermediates are not found in a contaminated media, this is a general indication that MTBE degradation is not occurring, or is occurring at a very low rate. Accordingly, the treatment of the contaminated media may be modified to reinitiate or accelerate degradation of MTBE. If it is determined that modification of the treatment conditions is necessary, the treatment conditions can be modified in a variety of ways, including, for example, increasing the presence of the desired microorganisms at the site of contamination by direct injection, or by providing conditions which facilitate growth of the microorganisms. In addition, the microorganisms at the site may be supplemented with an efficient growth substrate, such as propane, isopropanol, acetone, or ethanol. In addition, the pH and temperature at the site of remediation may be modified to optimize MTBE degradation or nutrients may be provided in the form of soluble agricultural fertilizer or other compounds to optimize microorganism growth and degradation of MTBE.

Once a contaminated media has been treated in order to increase MTBE degradation, the monitoring and modification steps discussed hereinabove can be repeated until the site has reached the desired level of MTBE remediation.

The initial oxidation of MTBE substrates is believed to be facilitated by the enzyme propane monooxygenase (PMO) which incorporates a single oxygen atom into the substrate molecule. The oxidation of propane by propane-oxidizing bacteria, thus, results in the production of propanol which is further oxidized by the microorganisms via central metabolism (see FIG. 8). MTBE degradation by these strains results initially in the formation of TBA which is further degraded by the microorganisms to $CO_2$.

Analysis of the MTBE degradative pathway has demonstrated that the degradation intermediate 2-hydroxy isobutyric acid (HIBA) accumulates in the culture media and that HIBA degradation is the rate-limiting step in MTBE degradation. An exemplary way of overcoming this problem is to clone the genes involved in converting MTBE to HIBA into strains that can grow on HIBA and/or to clone the HIBA oxidation genes into a strain that produces PMO. Genetically-modified microorganisms containing both the genes for oxidizing HIBA and the PMO genes provide a biocatalyst that can grow on, and effectively degrade, gasoline oxygenates, such as MTBE, as sole sources of carbon and energy.

Accordingly, there are a variety of ways in which to optimize degradation of MTBE. For example, a bacterial strain which contains both the genes capable of degrading propane or isopropanol, as well as the genes capable of degrading HIBA, can be prepared or isolated. Such a microorganism may either be isolated naturally or prepared using genetic engineering techniques.

In one embodiment of this aspect of the present invention, a microorganism which is capable of propane- or isopropanol-oxidation (for example: *Mycobacterium vaccae* JOB5, ATCC 29678; Strain ENV420; Strain ENV421; and Strain ENV425) is modified genetically by introducing the genes encoding the enzymes which are effective in oxidizing HIBA. (The term "modified genetically", as used herein, refers to introducing into a desired microorganism the cloned genes for either propane- or isopropanol-oxidation, and/or the genes responsible for HIBA oxidation.) The genes are preferably cloned in a plasmid or transposon vector system which possesses a promoter capable of providing for sufficiently high level expression of the desired genes. Examples of acceptable promoters known in the art include lac, tac, t7 or lambda $P_L$ promoters. The plasmid vectors or transposons are introduced into the microorganism utilizing techniques which are available in the art, for example, bacterial mating, transformation or electroporation. Various of these techniques are described in more detail hereinbelow.

In an alternative embodiment, the desired microorganisms can be prepared, for example, by genetically modifying a microorganism possessing the HIBA-oxidizing genes to contain the genes encoding the enzymes effective in oxidizing propane or isopropanol.

In still another embodiment, microorganisms which initially do not possess the ability to oxidize propane, isopropanol, or HIBA, such as *E.coli,* can be modified genetically to contain both the genes encoding the enzymes which are effective in oxidizing propane or isopropanol and the genes encoding the enzymes effective in oxidizing HIBA. The cloned genes may be placed in expression vectors which facilitate high level expression of the gene products in *E.coli* or other suitable host strains, such as, for example, Pseudomonas, Rhodococcus, Mycobacteria, *M.smegmatis* strains, or other microorganisms native to the contaminated site.

An additional method for degrading an ether or MTBE-contaminated media comprises contacting the ether with a propane- or isopropanol-oxidizing microorganism and a microorganism which is effective in oxidizing 2-hydroxy isobutyric acid. Such a "dual" microorganism approach can provide for optimal degradation of a contaminated medium.

There follows a description of various exemplary means for providing microorganisms that have genes which encode the enzymes which facilitate oxidation of propane and isopropanol and/or genes which encode the enzymes that facilitate oxidation of HIBA. Protocols are described for isolating and cloning propane monooxygenase genes which are believed to be responsible for the oxidation of propane and isopropanol and for genes that have the ability to oxidize HIBA.

Three general strategies are described for cloning PMO (and HIBA) genes. The involved techniques are common and are described by Sambrook et al. (*Molecular Cloning: A Laboratory Manual,* 2nd ed., Cold Spring Harbor Laboratory Press, Cold Spring Harbor, N.Y. (1989)). Molecular methods for use with Mycobacteria are described in detail by Jacobs et al. ("Genetic Systems for Mycobacteria," *Methods Enzymol.,* 204:537–555 (1991)).

In one strategy, specific DNA probes are generated by using PCR products derived from known P450 genes. In a second strategy, transposon mutagenesis is used to knock-out PMO (or HIBA) activity and DNA flanking the inserted transposon is used as a DNA probe. In the third strategy, degenerate oligonucleotide probes are generated based on known conserved sequences of P450 enzymes. Each probe is used for Southern blotting analysis to identify restriction fragments that contain the target genes. The fragments are then isolated from agarose gels and cloned into laboratory cloning vectors. If needed, the probes are used with colony hybridization experiments to identify target clones in a gene library or from Southern blot clones.

The first step in cloning the desired propane monooxygenase gene involves obtaining DNA encoding this gene. This can be accomplished, for example, by isolating genomic DNA from four of the disclosed propane-oxidizing strains (JOB5, ENV420, ENV421, and ENV425) by a modification of the procedure of Olsen et al. ("Development of Broad-Host-Range Vectors and Gene Banks: Self-Cloning of the *Pseudomonas aeruginosa* PAO Chromosome," *J. Bacteriol.,* 150:60–69 (1982)). Total genomic DNA obtained in this way is digested with several different restriction enzymes, is utilized as the target for Southern hybridization experiments, and is used as a source of target DNA for PCR amplification of probe DNA.

The next step is to generate gene probes which are capable of identifying the desired PMO gene sequence in the isolated genomic DNA. It has been observed that the PMO produced by strain ENV425 is a soluble P450-monooxygenase. More than 400 P450 gene sequences have been elucidated (see Nebert et al., "The P450 Superfamily: Updated Listing of All Genes and Recommended Nomenclature for the Chromosomal Loci," *DNA,* 8:1–13 (1985)). Based on this sequence information, which enables one to identify highly conserved DNA or amino acid sequences among the many families of P450s, there can be prepared degenerate PCR primers which are used to amplify DNA sequences flanked by conserved sequences. The amplified DNA is then used as gene probes to identify target genes in DNA Southern blots. An example of this approach is provided in Miles ("Structurally and Functionally Conserved Regions of Cytochrome P-450 Reductase as Targets for DNA Amplification by the Polymerase Chain Reaction," *Biochem. J.,* 287:195–200 (1992)).

The primers developed by Miles (1992) are used to amplify the PMO P450 reductase component. The amplified DNA is radiolabeled by using nick translation or direct label incorporation and then used as a probe for identifying the PMO reductase component on Southern blots of the propane-oxidizing strains (for example, strains JOB5 and ENV425). The largest fragments (>5 kb) that hybridize to the probe are cloned into laboratory cloning vectors and the clones assayed for PMO activity. If no activity is identified, the cloned DNA can be used as probes to "walk" along the chromosome to clone PMO genes. Studies of many P450 systems suggest that the hydroxylase and reductase genes of the systems are usually located close to one another on bacterial chromosomes (Nebert et al., supra).

If no PMO clones are identified by the aforedescribed method, or if no PCR products are produced with the primers, additional primers, based on P450 hydroxylase homologies (see Task 1.d. below), can be developed and similarly tested. In an alternative method for cloning the PMO genes, transposon mutagenesis is used to inactivate the PMO genes. Each of the propane-oxidizing microorganism grows well on rich media (PTGY media). Thus, transposon mutants are selected based on their ability to grow on PTGY media, but not on basal salts media (BSM) with propane as a sole carbon source. Transposon mutants of the strain(s) are constructed using transposon donors known to work in gram positive and gram variable microorganisms. A variety of transposons can be used including, for example, a number of mini-Tn5 transposons developed by Timmis and colleagues (see Herrero et al., "Transposon Vectors Containing Non-Antibiotic Resistance Selection Markers for Cloning and Stable Chromosomal Insertion of Foreign Genes in Gram-Negative Bacteria," *J. Bacteriol.,* 172:6557–6567 (1990)); Tn916 (Christie et al., "Two Conjugation Systems Associated with *Striptococcus faecalis* Plasmid pCF10: Identification of a Conjugative Transposon that Transfers Between *S. faecalis* and *Bacillus subtilis,*" *J. Bacteriol.,* 169:2529–2536 (1987)); Tn917 (Shaw and Clewell, "Complete Nucleotide Sequence of Macrolide-Lincosamide-Streptogramin B-Resistance Transposon Tn917 in *Streptococcus faecalis,*" *J. Bacteriol.,* 164:782–796 (1995)); and Tn610 (Martin et al., "Transposition of an Antibiotic Resistance Element in Mycobacteria," *Nature,* 345:739–743 (1990)). Such transposons have been used successfully to construct mutants in Arthrobacter, Mycobacterium, and Rhodococcus. The transposons (on suicide donor plasmids) are introduced into the strains by conjugation or by electroporation. If necessary, transformation can be performed by first creating spheroplasts, or by performing electroporation with spheroplasts as previously described (Jacobs et al., supra). Because most Mycobacteria are sensitive to aminoglycoside antibiotics, kanamycin resistance is used as selective marker for use in transposon mutagenesis, but other antibiotic resistance markers can be used as needed. Transconjugates are plated onto LB or R2A media containing 10 to 25 mg/ml Km. Km resistant cells are then replica-plated onto basal salts media (BSM) without an added carbon source and incubated in a sealed jar containing 25% propane in air. Strains containing a transposon insertion are, thus, screened for the inability to grow on propane, indicating that the insertion is in or near the genes of interest.

Genomic DNA is then prepared from the transposon mutant strains and a region of the genome containing the transposon is cloned by selecting $Km^r$ clones that contain the transposon. The genomic region flanking the transposon can be used as a probe to locate the analogous region from the wild type genome by methods described above. Restriction mapping and sub-clone analysis can be used to locate the position of the transposon insertion on a map of the wild type cloned fragment.

There are well-defined cloning methods for isolation of the genes for the P450 enzymes and these methods can be used to isolate the PMO genes (Hotze et al., "Cinnamate 4-Hydroxylase from *Catharanthus roseus,* and a Strategy for the Functional Expression of Plant Cytochrome P450 Proteins as Translational Fusions with P450 Reductase in *Escherichia coli*", *FEBS Lett.,* 374:345–350 (1995)). The bacterial P450 family, containing cytochrome P450cam from *P. putida* (Raag, et al., "Crystal Structure of the Carbon Monoxide-Substrate-Cytochrome P450cam Ternary Complex," *Biochemistry,* 28:7586–7592 (1989)), provides the method for generation of oligonucleotide probes. Probes are made to correspond to a region of highly conserved primary sequence centered at C357, the proximal ligand to the heme which is identically conserved in all P450 sub-families (Nebert, et al., supra). Total chromosomal DNA from the propane oxidizer is prepared as described above and the DNA screened by Southern blotting with the P450 probes (Sambrook et al., supra) to identify restriction fragments that hybridize to the P450 probes. Large fragments that hybridize are cloned directly into cloning/sequencing vectors and the clones screened by using colony hybridization and the P450 probes. Since most P450 enzymes are monomeric enzymes in the molecular weight range of 45–60 kDa, DNA fragments in the 1.2 to 1.6 kb size range are isolated for further study.

If the probe does not work well with Southern blotting techniques (e.g. too many degeneracies or insufficient probe length), the digested DNA can be ligated to a common laboratory sequencing vector (e.g. pUC18not; Herrero et al., supra) and PCR can be performed using the degenerate probe as one primer and a sequencing primer as another. This strategy facilitates the amplification of a larger DNA fragment that is more suitable for use as a probe. Because the amplified fragment is completely complimentary to the target gene, a much higher stringency can be used to detect hybrids. Because the DNA fragment has been ligated into the multiple cloning site of the vector, the amplified fragment has additional terminal restriction sites making subsequent subcloning, DNA mapping, and probe construction simplified.

In another procedure for isolating the desired PMO genes, genomic cosmid libraries of *M. vaccae* are constructed by using the broad host range cosmid pLAFR1 (Friedman et al., "Construction of a Broad Host Range Cosmid Cloning Vector and Its Use in the Genetic Analysis of Rhizobium Mutants," *Gene,* 18:289–296 (1982)) and commercially available lambda phage in vitro packaging kit (BRL or Stratagene). Total genomic DNA is isolated from *M. vaccae* by using the method of Belisle et al. ("Isolation and Expression of a Gene Cluster Responsible for Biosynthesis of the Glycopeptidolipid Antigens of *Mycobacterium avium,*" *J. Bacteriol.,* 173:6991–6997 (1991)) and partially digested with restriction enzymes (either BamHI of EcoRI). The partially digested DNA in the range of 25 kb in size is cloned into a similarly digested cosmid and packaged into the lambda heads. The lambda clones are then be used to infect a recipient *E. coli* strain and the clones are plated on media containing tetracycline, X-gal (a chromatophoric substrate for identification of LacZ expression) and IPTG (a Plac inducer) to estimate the percentage of potential clones with inserted DNA. If a sufficient percentage of clones with inserts is generated, the entire infection mixture is plated onto media without IPTG or X-gal and colony hybridization can be performed to identify clones with potential PMO DNA. Fragments isolated during Task 1b and 1c can be used as probes.

Alternatively, a portion of the library can be plated onto LB agar plates containing IPTG and tetracycline and the colonies subjected to the naphthalene oxidation assay (see Task 3 below) to directly select clones that express PMO.

There follows a description of how there were isolated bacterial strains that grow rapidly on 2-hydroxy isobutyric acid (HIBA) and that use it as a sole source of carbon and energy. In isolating HIBA-degrading bacteria, approximately 1 g of soil was added to 100 ml of BSM media containing 50 to 100 mg/L HIBA. The cultures were then closed with foam stoppers, placed on a rotary shaker, and incubated at room temperature until an increase in turbidity was noticed by visual inspection. One ml of the culture was then transferred to another flask containing 100 ml of BSM+HIBA and the flask was again incubated with shaking at room temperature. After noticeable growth, the culture was streaked onto BSM agar plates containing HIBA (50 to 100 mg/L) and the plates were incubated inverted at 25 to 30° C. Individual colonies growing on the plates were streaked for purity onto fresh BSM+HIBA agar plates.

The ability of these colonies to utilize HIBA as a sole carbon source was confirmed by transferring individual colonies from the HIBA plates to a flask containing sterile BSM+HIBA media. The flasks were incubated with shaking and isolates which grow in the BSM+HIBA media were confirmed as having the ability to grow on HIBA as a sole source of carbon and energy.

The isolated strains can be used to clone HIBA-oxidative genes by subjecting them to transposon mutagenesis as described above. DNA is isolated from mutants unable to grow on HIBA, cloned into *E. coli,* and then used as probes to identify and clone HIBA-oxidative genes from Southern blots. *E. coli* clones can be screened for HIBA degradation activity by performing HIBA depletion bottle assays.

To produce expression vectors to express the PMO genes, individual cloned genes as well as groups of cloned genes encoding for successive steps in the propane monooxygenase pathway are cloned into expression vectors downstream of promoters such as lac, tac, T7, or lambda $P_L$. This provides for high level expression of the gene products in *E. coli* or other suitable host strains (eg. Pseudomonas, *M. smegmatis,* or other native aquifer organisms). The expression constructs also have the advantage that only the desired reaction(s) will take place. In this manner, the metabolic transformations of various substrates can be tested in a well-defined genetic background that is free of any other enzymes capable of further transforming the substrate or its metabolites. The hosts will also be unable to induce uncloned genes present in the original microbial strain. This tends to avoid further degradation of the products in subsequent metabolic steps. Thus, the exact substrate range of a particular enzyme or pathway can be determined with identification of the products formed. The hyperexpression of the desired gene(s) also allows for the detection of metabolites that are produced in low levels by the wild-type strain, or that are relatively unstable.

Initial expression experiments can be performed in *E. coli,* followed by expression of the HIBA genes in PMO-producing strains, and vise versa. Methods and tools for inserting genes into Nocardioform organisms are available (Vogt-singer and Finnerty, "Construction of an *Escherichia coli*-Rhodococcus Shuttle Vector and Plasmid Transformation in Rhodococcus spp.," *J. Bacteriol,* 170:638–645 (1988)).

If none of the clones which have been screened in the manner described above has activity against MTBE, the DNA can be digested and sub-cloned into expression vectors (eg. pUC18not; Herrero et al., supra). Sub-clones can be plated on selective media and resulting colonies can be screened by performing a calorimetric naphthalene oxidation assay that allows identification of active strains. Naphthalene is added to the lid of agar plates containing the colonies, and incubated from 1 to 24 hr. Colonies can then be sprayed with a solution of 2 mg/ml o-dianisidine (CAS # 84633-94-3). Colonies that oxidize naphthalene to naphthol become bright red in the presence of this dye. This provides a reliable assay for expression of PMO by *M. vaccae.* Positive clones can be further analyzed to measure PMO activity and additional sub-cloning can be performed to express the genes from other promoters (e.g. Pm from the Tol plasmid on pNM185; Mermod et al., "Vector for Regulated Expression of Cloned Genes in a Wide Range of Gram-Negative Bacteria," *J. Bacteriol.,* 167:447–454 (1986)).

The cloned genes can also be cloned into *M. smegmatis* using the protocols described by Jacobs et al., supra, and Snapper et al., ("Lysogeny and Transformation in Mycobacteria: Stable Expression of Foreign Genes," *Proc. Natl. Acad. Sci. USA,* 85:6987–6991 (1988); Isolation and characterization of efficient plasmid transformation mutants of Mycobacterium smegmatis. Snapper SB, Melton RE, Mustafa S, Kieser T, Jacobs W R Jr Mol Microbiol 4 (11): 1911–1919 (November 1990).

As an alternative to using shuttle vectors to insert the sub-cloned DNA into Mycobacteria strains, the sub-cloned DNA in pUC18not can be excised and cloned into the transposon mini-Tn5-KM1 (DeLorenzo et al., "Mini-Tn5 Transposon Derivatives for Insertion Mutagenesis, Promotor Probing, and chromosomal Insertion of cloned DNA in Gram-Negative Eubacteria," *J. Bacteriol.,* 72:6568–6571 (1990)) and inserted into *M. smegmatis* by transformation. This insertion may also be done by electroporation. Resulting clones can be screened for PMO activity.

Other expression systems, including broad host range plasmids, can be used to express genes in *P. putida* KT2442 (developed in the laboratory of Dr. K. N. Timmis (Mermod et al., supra)). The systems can be employed as needed to obtain PMO activity from the cloned genes.

PMO genes can be cloned into strains that grow on HIBA and HIBA-degradative genes can be cloned into PMO-containing hosts to generate strains that can grow on MTBE as a sole source of carbon and energy.

The relative activity of PMO clones against MTBE can be measured using the techniques discussed hereinabove. Specific oxidation rates can be determined by performing standardized bottle assays to measure substrate depletion (McClay et al., "Chloroform Mineralization By Toluene-Oxidizing Bacteria," *Appl. Environ. Microbiol.,* 62:2716–2722 (1996)). Degradation of chlorinated solvents also can be evaluated using standard methods.

EXAMPLES

The following examples are illustrative of the practice of the present invention and demonstrate its use to degrade effectively MTBE and TBA. The examples include degradation of MTBE in a bioreactor and degradation of MTBE in situ.

Bacterial Strains and Growth

The bacterial strains ENV420, ENV421 and ENV425 are examples of propane-oxidizing bacteria isolated from environmental samples. The organisms were isolated from soil by adding approximately 1 g of soil to a 250 ml Erlenmeyer flask containing 100 ml of basal salts media ("BSM"; Hareland, W., R. L. Crawford, P. J. Chapman, and S. Dagley. 1975. Metabolic function and properties of 4-hydroxyphenylacetic acid 1-hydroxylase from *Pseudomonas acidovorans. J. Bacteriol.* 121:272–285). The flasks were sealed with rubber stoppers that were pierced with an 18 gauge needle. The needle was fitted with a sterile filter unit (Nalgene, cat. no. 190–2520; 25 mm diameter; 0.2 $\mu$M pore size) and a three-way stopcock was fitted to the top of the filter unit. A vacuum was applied to the needle assembly to remove air from the flask headspace and 60 ml of propane were injected through the stopcock and filter into the flask. The stopcock was opened briefly to allow air to flow into the flask and to reach atmospheric pressure. The flasks were then incubated at room temperature with constant shaking (200 rpm) to allow growth of propane-oxidizing bacteria.

Once visible growth was observed in the flasks, a portion of the culture was removed and placed into a similar vessel containing sterile BSM and the incubation was repeated. After three such transfers, a portion of the culture was diluted with fresh BSM and plated onto BSM/agar plates. The plates were inverted and incubated in a sealed jar containing an atmosphere of 20% propane in air. The gasses within the sealed jars were replaced periodically with a fresh gas mixture, and the plates were incubated until colonies appeared. Individual colonies were streaked on fresh BSM/agar plates and grown on propane to insure purity of the culture. Once pure cultures were obtained, colonies of the bacteria were transferred to flasks and grown in propane as described above.

Strain ENV420 is a gram positive rod. Strain ENV421, like ENV420, appears to be a Nocardioform bacteria whose fatty acid profile does not match any other in currently available fatty acid databases. Strain ENV425 is a gram positive rod that forms red to orange colonies on BSM or rich media.

The propane-oxidizing bacteria *Mycobacterium vaccea* JOB5 was obtained from the ATCC (ATCC identification number 29678) and grown on a rich media PTGY media or on BSM plus propane as described above. One liter of PTGY media contains: 1 g glucose; 1 g yeast extract; 0.5 g peptone; 0.5 g tryptone; 0.6 g magnesium sulfate (7-hydrate); 0.07 g calcium chloride (anhydrous); and 17 g of bacto agar.

To test the ability of the propane-oxidizing bacteria to grow on other substrates, various test strains were grown on BSM plus isopropanol, BSM plus ethanol or BSM plus acetone. To grow the cells on BSM plus isopropanol, ethanol or acetone, the cells were placed into BSM containing from 0.1 to 1% (v/v) isopropanol, ethanol, or acetone and incubated at 25 to 30° C. with constant shaking. Alternatively, the cells were streaked onto BSM/agar plates containing 0.1 to 1% isopropanol, ethanol, or acetone and incubated in an inverted position until colonies formed. The growth rate of the cells on BSM with either propane, propanol, ethanol, or acetone could be enhanced by the addition of casamino acids (0.02%) or yeast extract (0.02%) to the growth media. Cell growth was measured by monitoring the optical density of the culture at 550 nm ("$OD_{550}$") in a Spectronics 20 spectrophotometer.

Gas Chromatography Assay for Methyl-tert-Butyl Ether, Ethyl-tert-Butyl Ether, and Tert-Butyl Alcohol Degradation Propane-oxidizing microorganisms were grown as described above on either propane, isopropanol, ethanol or acetone, to a cell density of $OD_{550} \geq 0.5$. The cells were then collected by centrifugation, washed with BSM, and suspended to an $OD_{550}$ of 1.0. Five ml of cell suspension were placed into 10 ml serum vials and MTBE, ETBE, or TBA dissolved in distilled water was added to a final concentration of 5 to 100 mg/L (ppm). The vials were sealed with Teflon-lined septa and crimp seals and incubated with shaking (250 rpm) at 30° C. for at least 24 hr. Control samples were prepared by adding 50 $\mu$l of 10 mM $HgCl_2$ to replicate vials. $HgCl_2$ killed the microorganisms present in the vials allowing these vials to serve as controls. At pre-determined time points, 50 $\mu$l of 10 mM $HgCl_2$ were added to the incubating sample to stop the reaction or a sub-sample of the incubating sample was removed for analysis. Degradation of MTBE, ETBE or tert-butyl alcohol (TBA) was measured by gas chromatography.

Gas chromatography was performed by first removing cells from the samples by centrifugation of the sample vial or the sub-sample. A pre-sealed 2-ml autosampler vial was partially evacuated by inserting a syringe needle through the septa and removing 500 $\mu$l of air. Five hundred $\mu$l of the clear supernatant fraction of the cell culture were then injected into the vial. The samples were then analyzed by injecting 1 $\mu$l of the sample directly into a Varians Model 3400 gas chromatograph equipped with a 30 m Vocol capillary column (Supelco) and a flame ionization detector. The column, injector, and detector were maintained isocratically at 80° C., 200° C., and 225° C., respectively. Standard curves of each compound were generated with aqueous standards of 10 ppm, 25 ppm, 50 ppm, and 100 ppm. The retention time of the target compounds were: MTBE, 0.75 min; TBA, 0.68 min; and ETBE, 8.04 min.

Example 1

The ability of three propane-oxidizing bacterial strains to degrade MTBE, ETBE and TBA after growth on various substrates is presented in Table 1. To perform these studies, cells were grown in BSM on the listed substrate, washed, suspended in BSM to an optical density at 550 nM of 1.0, and incubated for 24 hours with 30 mg/l of either MTBE, TBA or ETBE. Gas chromatography analysis, as described above, was used to quantitate the percentage of MTBE, TBA, or ETBE degraded during the 24-hour time period.

TABLE 1

| Strain | Growth Substrate | % MTBE Degraded | % TBA Degraded | % ETBE Degraded |
|---|---|---|---|---|
| M. vaccae JOB5 | propane | 100 | 45 | 100 |
| | isopropanol | 93 | 11 | 80 |
| ENV420 | propane | 50 | 10 | 0 |
| | ethanol | 86 | 56 | 31 |
| ENV425 | propane | 67 | 23 | 26 |
| | isopropanol | 71 | 0 | 14 |

Example 2

FIG. 1a shows the degradation of MTBE by propane-grown *Mycobacterium vaccae* JOB5 (ATCC 29678). The strain degraded 100% of the added MTBE (518 µM; 46 ppm) within 24 hr. Biodegradation of MTBE resulted in the transient accumulation of TBA which is subsequently degraded by the microorganism. MTBE was not degraded by cultures that had been poisoned with $HgCl_2$.

Example 3

FIG. 1b shows the degradation of TBA by propane-grown *Mycobacterium vaccae* JOB5 (ATCC 29678). The strain degraded 100% of the added TBA within 24 hr. No TBA was degraded by $HgCl_2$-poisoned cells.

Degradation of MTBE by ENV425 and ENV420 following growth on ethanol or propane was measured chromatographically and the results are presented in FIGS. 2 through 5.

Example 4

FIG. 2 shows degradation of MTBE by Strain ENV425 which was provided with ethanol as the sole carbon and energy source.

Example 5

Figure 3:
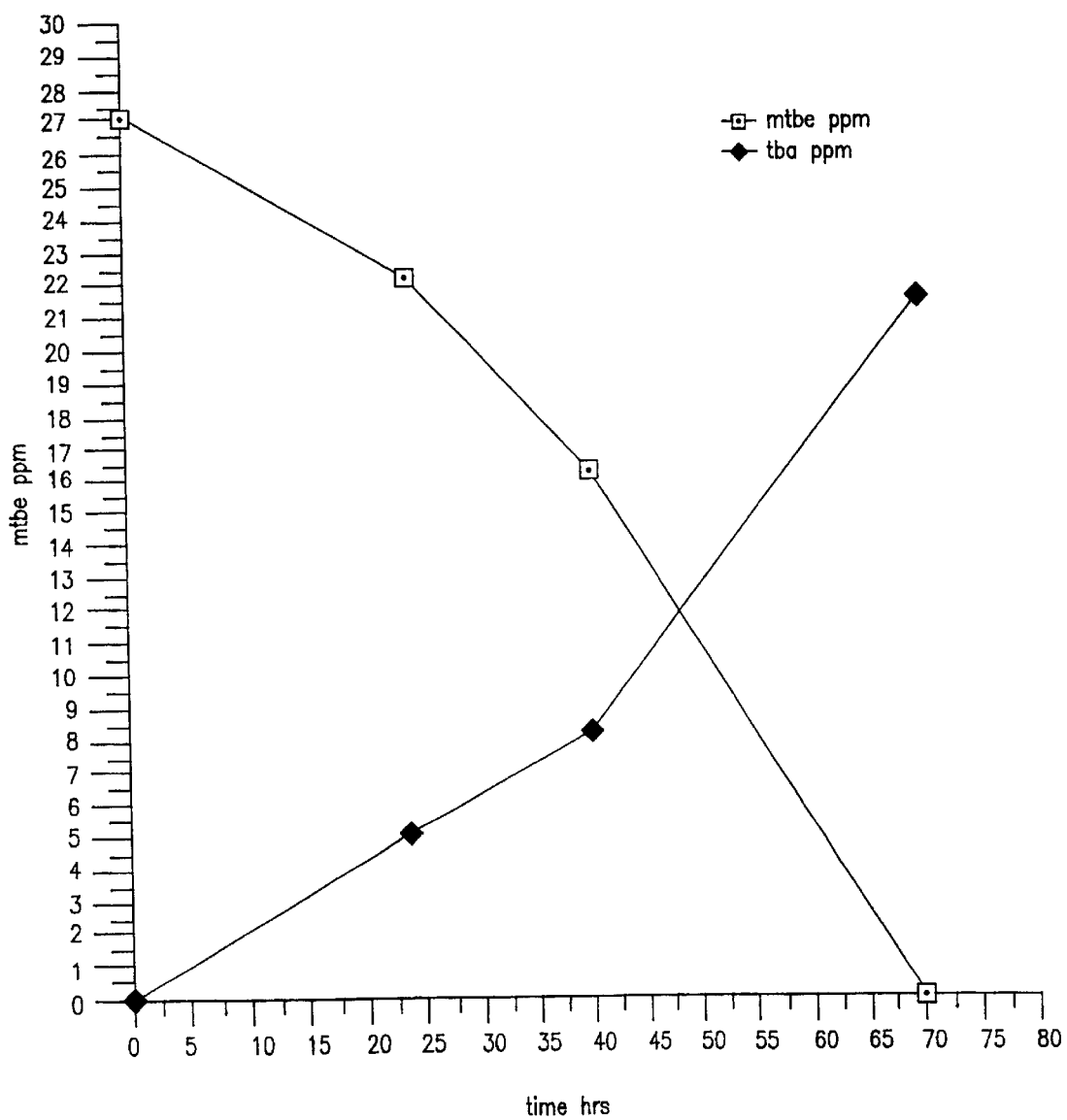
FIG. 3 is a graph which shows degradation of MTBE by strain ENV420 after growth on ethanol.

FIG. 3 shows degradation of MTBE by strain ENV 420 which was provided with ethanol as the sole carbon and energy source.

Example 6

Figure 4:
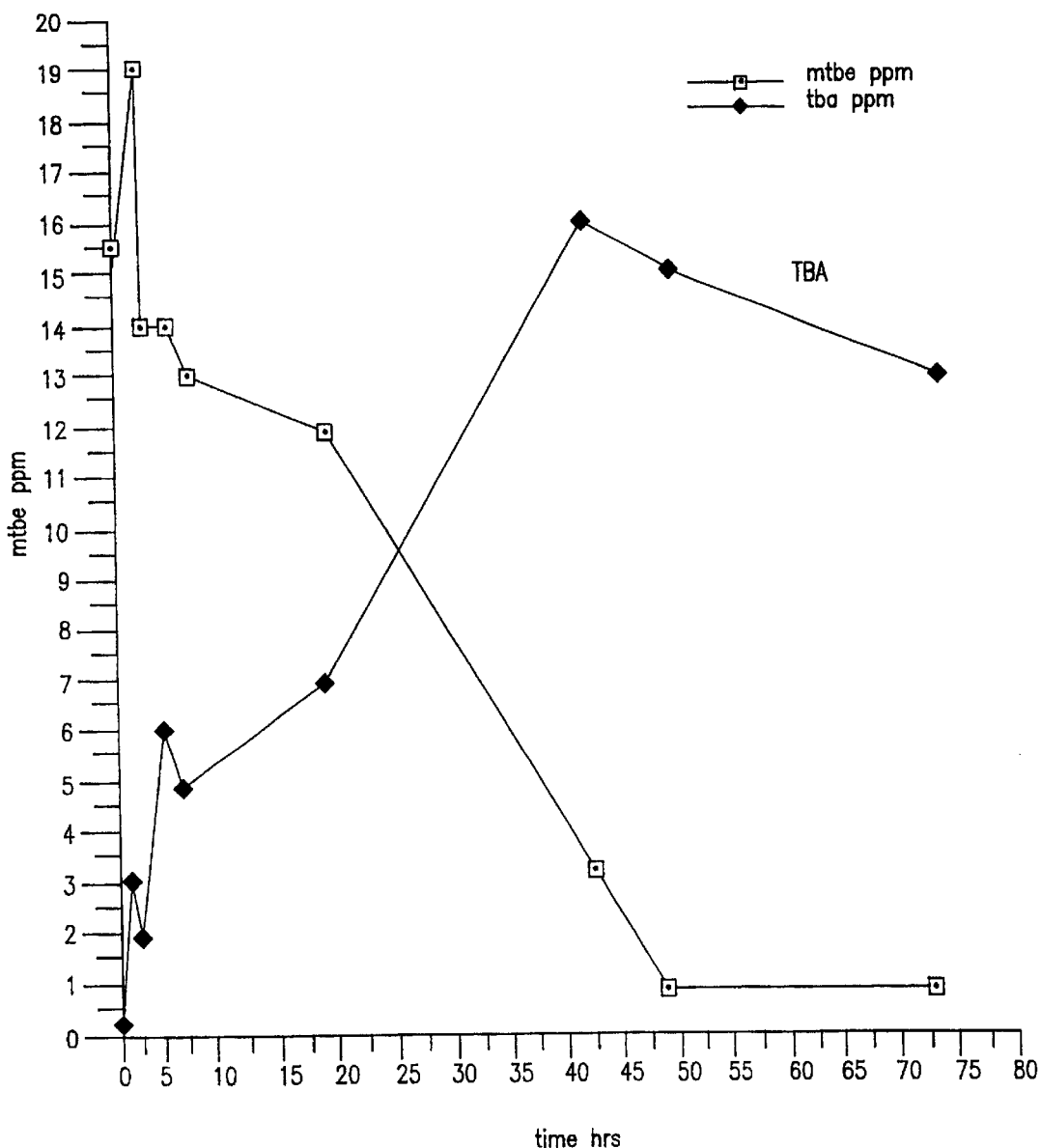
FIG. 4 is a graph which shows degradation of MTBE by strain ENV420 after growth on propane.

FIG. 4 shows degradation of MTBE by Strain ENV420 which was grown with propane as the sole carbon and energy source.

Example 7

Figure 5:
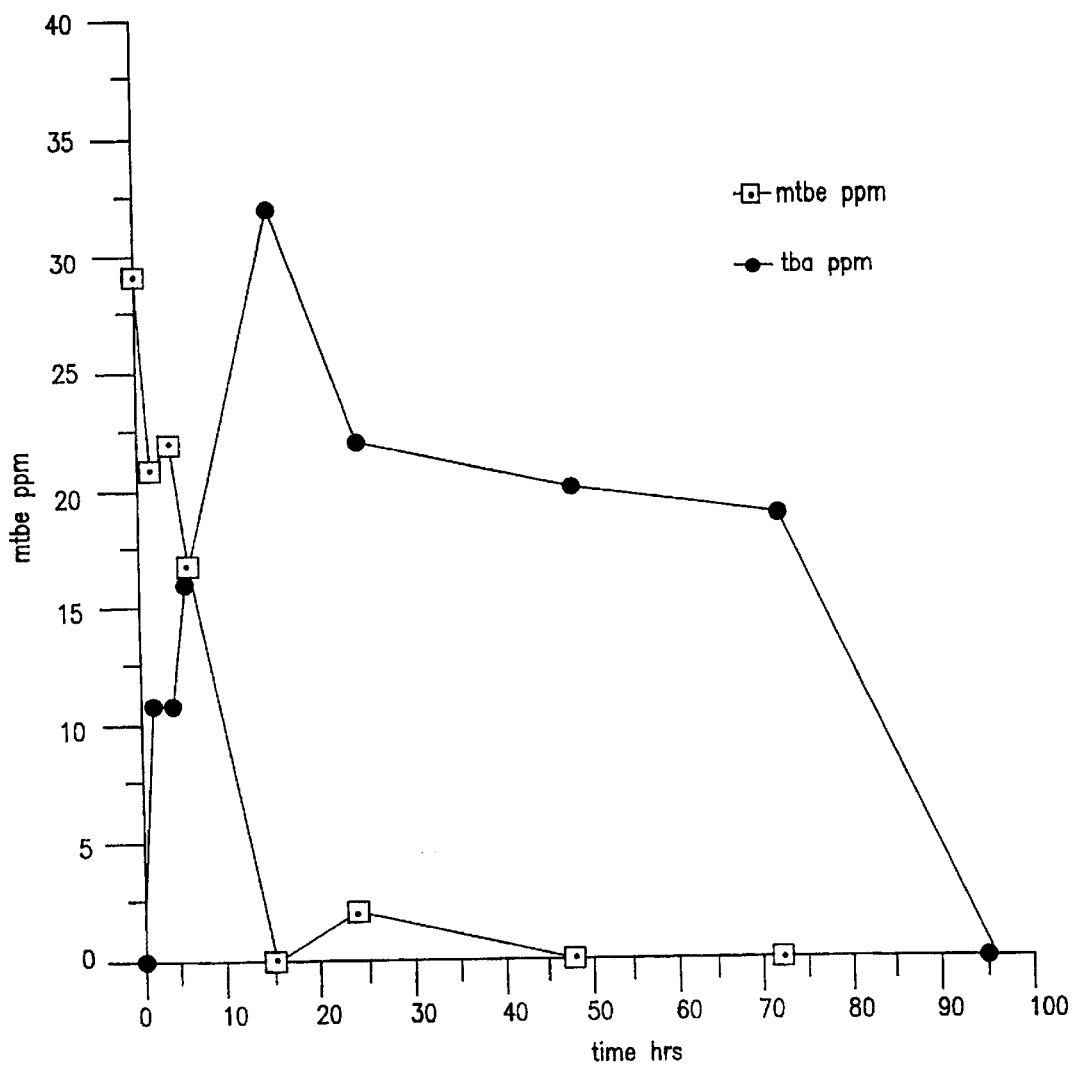
FIG. 5 is a graph which shows degradation of MTBE by strain ENV425 after growth on propane.

FIG. 5 shows degradation of ETBE by Strain ENV425 which was grown with propane as the sole carbon and energy source.

The next two examples illustrate also the degradation of MTBE by propane-oxidizing bacteria and include an assay that shows that significant portions of the MTBE are converted to $CO_2$.

Examples 8 and 9

[$^{14}$C]MTBE Assay

These examples include the use of propane-oxidizing bacteria that were incubated with radiolabeled MTBE. Assays were performed by preparing propane-grown cells as described above, adding 5 ml subsamples of washed cells to 26 ml serum vials, and amending the same with 1.36 µCi of uniformly labeled [$^{14}$C] MTBE (10.075 mCi/mmol; New England Nuclear Products, Boston, Mass.; Lot No. 3048-175A) in 2.5 µl ethanol. Twenty mg/L of non-labeled MTBE were also added to each vial. The vials were incubated at 25° C. with shaking (100 rpm) and at timed intervals, the samples were analyzed for MTBE, TBA, and radioactive products including $^{14}CO_2$. Analysis of radioactive products was performed as described by Speitel and colleagues (Speitel, G. E., R. C. Thompson, and D. Weissman, "Biodegradation kinetics of *Methylosinus trichosporium* OB3b at low concentrations of chloroform in the presence and absence of enzyme competition by methane," *Water Res.*, 27:15–24 (1993)). Preliminary testing demonstrated that this method produced measurements of $^{14}CO_2$ production that were comparable to methods that rely on trapping $^{14}CO_2$ in an alkaline solution.

To terminate the reactions and to draw gaseous $CO_2$ into the sample liquid, 75 µl of 2 N NaOH were injected through the septa. The vials were then returned to the shaker for 30 minutes. After incubation, 100 µl of the culture liquid were removed through the septa, placed in 5 ml of OptiPhas "Hi Safe III" scintillation cocktail (Wallac Scintillation Products, Turku, Finland) and the amount of radioactivity in the sample, as disintegrations per minute (dpm), was determined by liquid scintillation counting in a Wallac 1209 Rackbeta liquid scintillation counter (Pharmacia LKB Nuclear Inc., Gaithersburg, Md.). This basic fraction contained particulate $^{14}$C (cell fraction), dissolved $^{14}CO_2$, and unreacted [$^{14}$C]MTBE. It was used as a measurement of "total" counts recovered. To liberate the dissolved $^{14}CO_2$ from the aqueous phase, 500 µl of 6 N HCl were added to the vials and the acidified cultures were incubated for 30 minutes with shaking. A 100 µl aliquot of the culture was then withdrawn through the septa and liquid scintillation counting was performed as described above. This acidic fraction contained soluble $^{14}$C-labeled compounds, but not $^{14}CO_2$. The difference in dpm between the basic fraction and the acidic fraction was a measure of the $^{14}CO_2$ formed from [$^{14}$C]MTBE.

To remove any additional volatile $^{14}$C-labeled compounds from the aqueous phase, the vials were opened and gently agitated overnight. The amount of radioactivity remaining in both the soluble and particulate form was measured by removing 100 µl of the overnight culture for scintillation counting. The remaining culture was then centrifuged to remove the particulate fraction and 100 µl of the supernatant ("soluble" fraction) were removed for liquid scintillation counting. The "particulate" fraction was the difference in activity between the overnight culture and the "soluble" fraction. The total amount of $^{14}$C activity added was determined by adding 2 µl of the [$^{14}$C]MTBE stock directly to 5 ml of scintillation cocktail and performing liquid scintillation counting.

Table 2 below presents the results of [$^{14}$C]MTBE assays.

TABLE 2

Degradation of [$^{14}$C]MTBE by Propane-Oxidizing Bacteria
Percent of added [$^{14}$C]
in $CO_2$, liquid and particulate fractions[1]

| Strain | CO | Liquid | Particulate |
|---|---|---|---|
| M. vaccae JOB5 | 27(2) | 71(2) | 0 |
| ENV425 | 41 | ND | ND |
| TXR[2] | 53(1) | 46(1.5) | 0 |

ND - No data available.
[1]Cells were grown in BSM media with propane, washed, suspended to an optical density at 550 nm of 1.0, and incubated overnight with 0.5 µCi of uniformly-laveled [$^{14}$C]MTBE (2 µM MTBE). Cultures were fractionated as previously described, and the activity in each fraction was quanitated by liquid scintillation counting. Values represent the mean of three samples with standard deviations of the means in parentheses. Cultures of ENV425 were assayed at an optical density of 5.0.
[2]Culture "TXR" was a mixed culture of naturally-occurring propane-oxidizing bacteria recovered from a field pilot-scale bioreactor.

Strain ENV425, strain *M. vaccae* JOB5, and a mixed culture of natural propane oxidizers ("TXR") converted a significant portion of the added [$^{14}$C]MTBE to $^{14}CO_2$, thereby demonstrating that the cells completely mineralize MTBE to $CO_2$ and water.

The next example shows the use of a laboratory scale bioreactor to degrade MTBE by propane-oxidizing microorganisms.

Example 10
Use of a Laboratory-Scale Membrane Bioreactor for Degradation of MTBE To demonstrate the ability of the microorganisms described herein to degrade MTBE in a laboratory-scale bioreactor, cells of strain ENV425 were grown in a 3 L Applicon round-bottom fermentor (Cole Palmer) on BSM with 0.1% isopropanol.

The operating volume of media in the reactor was 2.5 L. The reactor was fed with BSM containing from 100 to 5000 mg/l MTBE, with or without the addition of an equal concentration of isopropanol to maintain high biomass in the reactor. The BSM feed rate was 1.7 ml/min. to create a hydraulic residence time in the reactor of 2.5 days. The effluent of the reactor passed over the surface of a 100,000 mwt ultra filtration membrane (Model CR250; Raisio Flootek, Molmo, Sweden), at a flow rate of 1.2 to 2.2 ml/min at a pressure of from 1 to 1.5 psi. The retenate containing cells were passed back into the reactor, and the filtrate was discarded as the treated effluent. The reactor was operated at 30° C. at a pH of 7. When the MTBE feed concentration exceeded 3000 mg/L, an additional 300 mg/l of nitrogen in the form of ammonium chloride, were added to the feed solution. Oxygen concentration within the reactor was monitored by using an Ingold pH probe and a Cole Palmer model 01971-00 oxygen monitor, and oxygen concentration was maintained at >1% air saturation by adding air or oxygen directly to the reactor. MTBE concentrations in the feed, reactor, and effluent were determined by gas chromatography as described previously.

Figure 6:
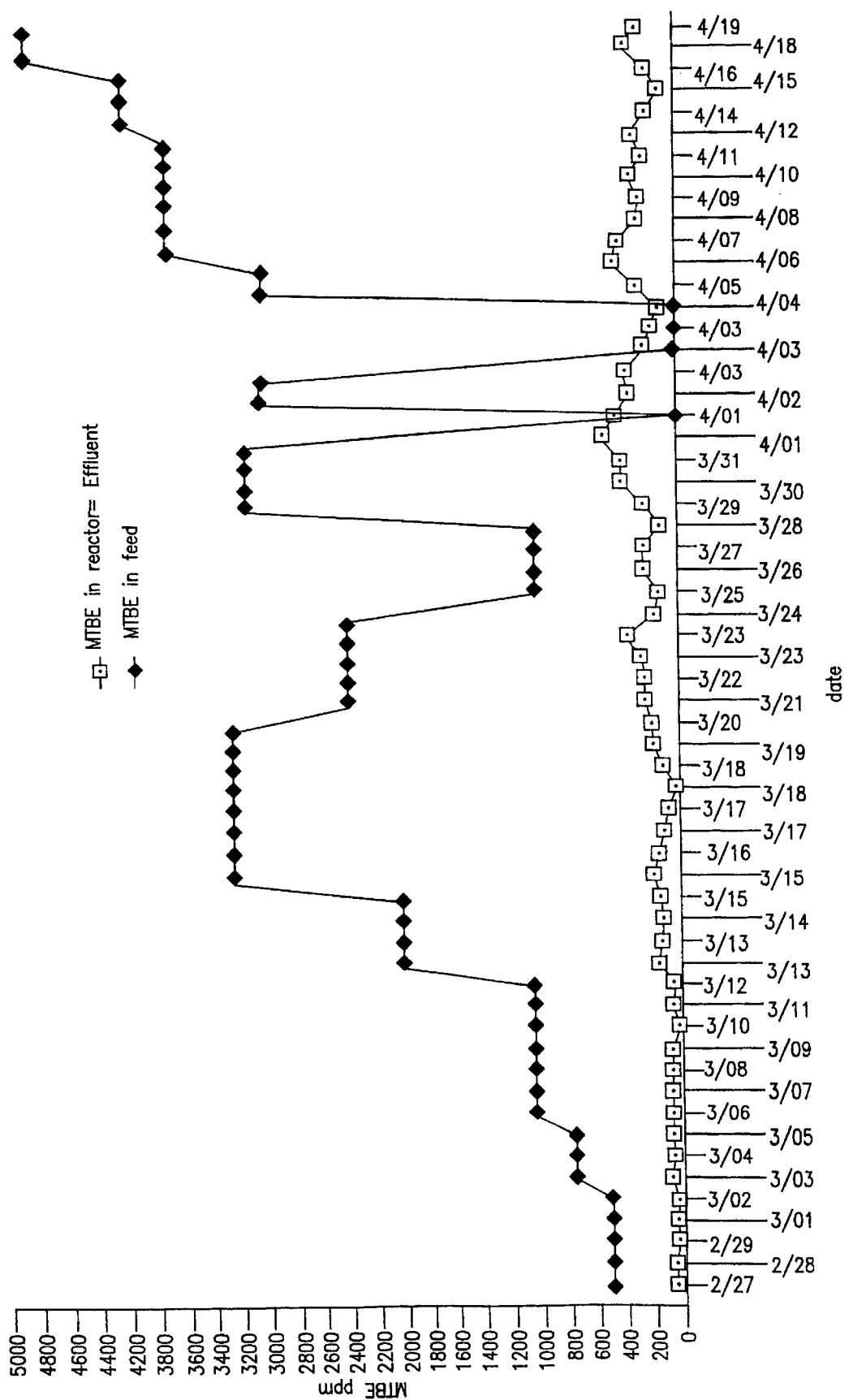
FIG. 6 is a graph which shows the degradation of MTBE over the course of approximately two months in a laboratory reactor.

Results of the laboratory reactor's performance are shown in FIG. 6. Greater than 95% of the MTBE added to the reactor was removed during the 2.5 day hydraulic retention time. The reactor operated successfully for more than 5 months. Measurement of volatile suspended solids, which reflect the biomass present in the reactor showed an increase from an initial concentration of <100 mg/L to more than 2200 mg/L during the treatment period. MTBE stripping from the reactor was typically <5% of the influent MTBE mass.

As mentioned above, previous attempts to treat MTBE in a bioreactor with non-propane oxidizers have involved slow growth of natural MTBE degraders and extremely long (up to 4 months) reactor start-up periods. (Salanitro et al., "Isolation of a Bacterial Culture that Degrades Methyl t-Butyl Ether," *Applied and Environmental Microbiology,* 2593–2596 (July 1994)). The present invention avoids these prior art problems by providing propane-oxidizing or isopropanol-oxidizing bacteria with an efficient growth substrate, such as propane, isopropanol, acetone or ethanol which enables the microbial population in the bioreactor to rapidly increase to a level where MTBE can be degraded, avoiding the slow growth and resultant start-up lags seen in many bioreactor systems. Furthermore, the ability to grow up the organisms on isopropanol, ethanol or acetone avoids the problems associated with use of propane which is an explosive material.

The ability to use isopropanol as a growth substrate to rapidly increase biomass is illustrated in the next example which shows the use of an industrial-size bioreactor to degrade MTBE by propane-oxidizing bacteria.

Example 11
Use of a Field-Scale Membrane Bioreactor System

Propane oxidizing bacteria were deployed in a field-scale membrane bioreactor (MBR) system to treat MTBE-contaminated groundwater at an oil refinery. An MBR is a type of suspended growth reactor.

The MBR system used in the present example consisted of a 1000-gallon tank equipped with a variable speed mixer, an air diffuser capable of providing up to 600 ft$^3$ of air per hour, an automated pH controller, and nutrient and caustic feed systems. Soda ash was used to control pH, and a soluble fertilizer, in this case fish oil emulsion, was used as a nutrient. (Other types of soluble agricultural fertilizer can be used to supply nutrients.) The weight ratio of the nutrient comprised approximately 100 parts carbon:10 parts nitrogen:1 part phosphate. The fertilizer was added continuously to the influent contaminant stream by using a LMI model A771-152S chemical metering pump. The liquid level in the reactor was controlled by using two Dwyer model 603-A level transmitters set to maintain a reactor liquid volume of from 700 to 900 gallons.

Temperature was controlled by using a Ametek #20 Big Blue 1" heat exchanger and cooling water from the site.

Figure 7:
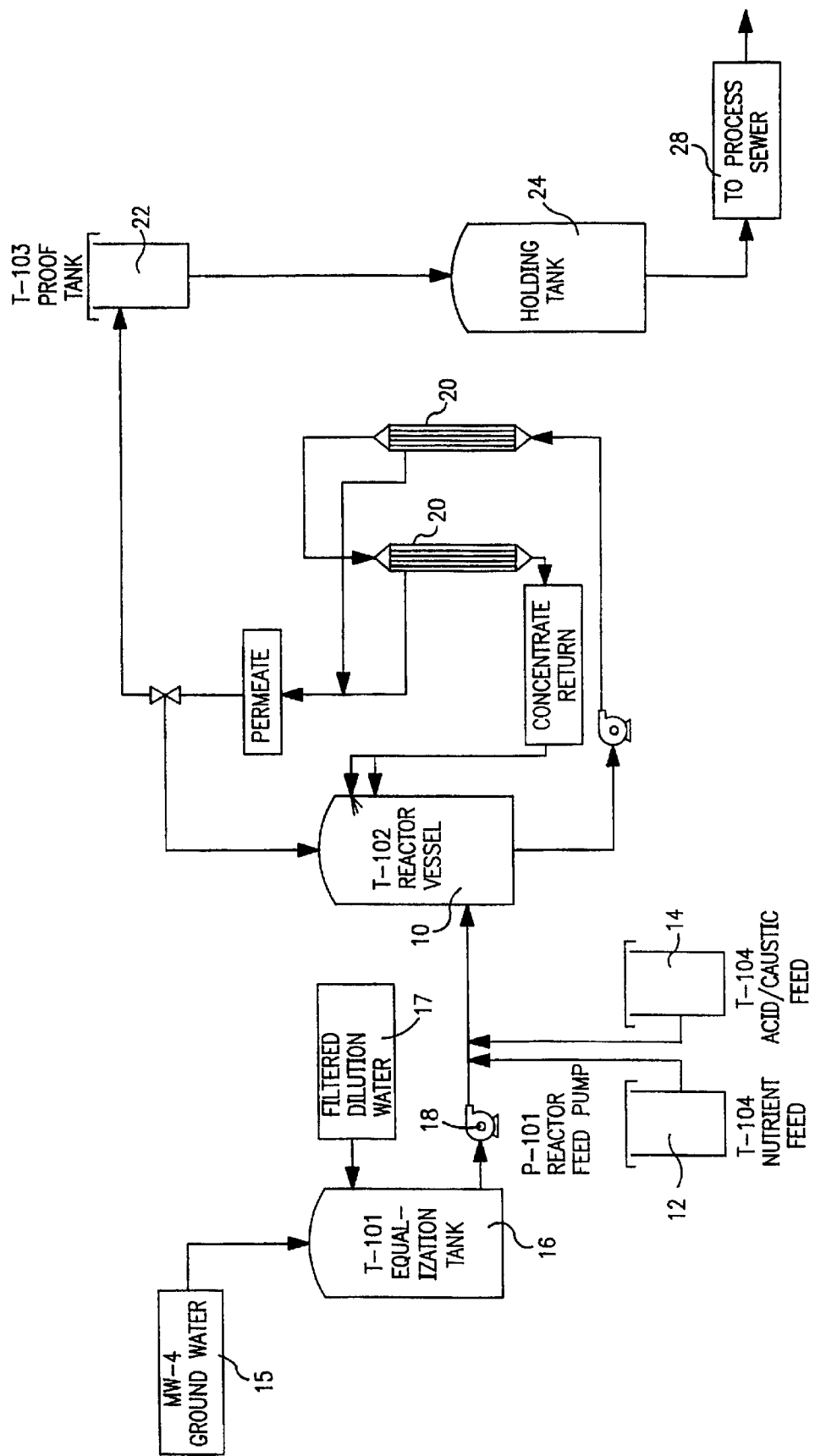
FIG. 7 is a schematic of a field-scaled membrane bioreactor system.

The pH was monitored and controlled by using a Rosemount model 1055APH pH analyzer/controller and a Rosemount model 385-2-8-54 pH sensor that measured pH in the reactor. Caustic was added to the influent feed line by using an LMI model A771-152S chemical metering pump. Effluent from the reactor was passed over dual ultrafiltration membranes (Rhone Poulenc model SC37/KO9; 17.22 ft$^2$ of membrane surface) connected in series, then into a proof tank and then a holding tank prior to discharge into the plant's sewer system. MTBE-contaminated groundwater (13,000 to 28,000 mg/L MTBE) was removed from a monitoring well on the site and placed into a 1000-gallon equilibration tank to create a feed concentration of 40 to 2400 mg/L MTBE. A schematic of the reactor system is shown in FIG. 7.

Operation of the reactor system was initiated by adding 225 gallons of water to the reactor and then adding concentrated BSM solution (see above) to the reactor to create a liquid concentration of 1×BSM. Twenty liters of frozen propane-grown ENV425 that had been grown in a laboratory fermentor in BSM medium with propane as a sole source of carbon and energy was frozen prior to shipment, then thawed and added directly to the water in the reactor. The ENV425 had an optical density at 550 nm of 20 in a spectronic 20 spectrophotometer prior to addition to the reactor. After addition to the reactor, the ENV425 was mixed well until dispersed. Then, 1.1 L of isopropanol were added while the reactor was mixing. The reactor was operated for 1.5 days until the culture became turbid. The reactor volume was then increased to 800 gallons, additional BSM was added to a final concentration of 1×BSM and an additional 3.8 L of isopropanol were added. The reactor was allowed to operate for an additional 2 days until the added isopropanol was consumed to increase biomass, prior to the addition of MTBE.

After cell density in the reactor had increased, MTBE-contaminated groundwater was added to the reactor to create a final concentration of 40 mg/L MTBE. Additional MTBE was added every 3 to 4 days, and the reactor was monitored for MTBE concentration, oxygen concentration (O&G), ammonia, total suspended solids (TSS), volatile suspended solids (VSS), pH, dissolved oxygen (DO), temperature, and oxygen uptake rate (OUR). This initial operation was termed the "batch phase" and was used to ensure equilibration of the reactor prior to initiating continuous feed operation. During the batch operation, the reactor contents were periodically passed over the ultrafiltration membranes to equilibrate the organisms to the sheer forces exhibited by the membrane system.

The continuous feed operation of the reactor was initiated by filling the equilibration tank with water and MTBE-contaminated groundwater to a final MTBE concentration of approximately 100 mg/L. The feed solution was then fed into the reactor at a rate of approximately 11 gallons/hr to create a hydraulic retention time in the reactor of approximately 3 days. Reactor effluent was passed over the ultrafiltration membranes and retenate, containing the propane-oxidizing bacteria, was returned to the reactor. Filtrate was passed to the proof tank, and a portion of the filtrate was pumped back into the reactor to maintain an appropriate liquid volume. This was done because the flux through the membrane (40 gal./day/ft$^2$ of membrane) was greater than the feed rate to the reactor. Some of the return liquid passed through a spray nozzle at the top of the reactor to control reactor foaming. Again, the reactor was monitored for MTBE concentration, oxygen concentration (O&G), ammonia, total suspended solids (TSS; also reported as "mixed liquor total suspended solids"; MLTSS), volatile suspended solids (VSS), pH, dissolved oxygen (DO), temperature, and oxygen uptake rate (OUR). Additionally, periodic samples of the reactor headspace were sampled to estimate MTBE stripping in the reactor.

During the continuous flow test, isopropanol was added to the equilibration tank, first in intermittent additions, then in a 1:1 ratio with the MTBE concentration. Isopropanol was used to rapidly increase biomass in the reactor and to maintain high levels of activity by the propane-oxidizing bacteria.

Results of batch and continuous reactor operation are shown, respectively, in Tables 3 and 4 below.

TABLE 3

Analytical Data-Batch Operations

| Batch No. | Date | MTBE mg/L | O&G mg/L | NH$_3$ mg/L | TSS mg/L | VSS mg/L | pH SU | DO mg/L | OUR mg/L/hr | Temp °C. |
|---|---|---|---|---|---|---|---|---|---|---|
| 1 | 12/4 | 40 | 10.3 | 0.03 | NA | NA | NA | NA | NA | NA |
|   | 12/6 | 15 | NA$^{(a)}$ | 224$^{(b)}$ | 400 | 357 | 7.45 | NA | NA | NA |
|   | 12/8 | 1.5 | NA | NA | NA | NA | NA | 5.5 | 18.4 | NA |
| 2 | 12/8 | 40 | 10.3 | NA | NA | NA | NA | 5.5 | 18.4 | NA |
|   | 12/13 | 2.5 | <5.4 | NA | 873 | 753 | 6.74 | 1.3 | 73.8 | NA |
| 3 | 12/13 | 40 | 10.3 | NA | NA | NA | 6.74 | 1.3 | 73.8 | NA |
|   | 12/16 | 0.2 | 12 | NA | 450 | 413 | 4.50 | BDL | NA | NA |
|   | 12/19 | BDL$^{(c)}$ | <5.4 | NA | 1410 | 1300 | NA | BDL | NA | NA |
| 4 | 12/19 | 40 | 10.3 | NA | NA | NA | NA | BDL | NA | NA |
|   | 12/22 | NA | 20.5 | 27.6 | NA | NA | 8.54 | 7.52 | 8 | NA |
| 5 | 12/22 | 76.7 | 20.5 | 27.6 | NA | NA | 8.54 | 7.52 | 8 | NA |
|   | 12/27 | 1.2 | <5.4 | 36 | 1600 | 1430 | 8.85 | 12.5 | NA | NA |
| 6 | 12/27 | 76.7 | 20.5 | 36 | 1600 | 1430 | 8.85 | 12.5 | NA | NA |
|   | 12/29 | 24 | <5.6 | NA | 1400 | 1200 | 8.63 | 18.8 | 48 | NA |
| 7 | 12/29 | 110 | 87 | NA | 1400 | 1200 | 8.63 | 18.8 | 48 | NA |
| 8 | 12/31$^{(d)}$ | 85.2 | 17.4 | 30 | NA | NA | 8.10 | 10.8 | 38.4 | 13 |
|   | 1/4 | 15 | <5.6 | 28.6 | 1400 | 1200 | 8.30 | 10.7 | 26 | 12 |
|   | 1/8 | 1.9 | <17 | 37 | 1360 | 1190 | 8.17 | 13.3 | 24 | 11 |
| 9 | 1/8 | 41 | 10.3 | 37 | 1360 | 1190 | 8.17 | 13.3 | 24 | 11 |
|   | 1/12 | 8.85 | <5.6 | 33.6 | 1470 | 1290 | 7.64 | 10.1 | 20 | 17 |
| 10 | 1/12 | 115 | 16.5 | 33.6 | 1470 | 1290 | 7.64 | 10.1 | 20 | 17 |
|   | 1/15 | 22 | <5.4 | 26 | 940 | 750 | 7.71 | 8.2 | 39.6 | 23 |
|   | 1/17 | 0.23 | NA | 21.8 | NA | NA | 7.82 | 6.2 | 54 | 32 |

(a) NA = Not analyzed
(b) Excess ammonia was added to the reactor tank.
(c) BDL = Below detection limit
(d) Additional 20 liters of contaminated ground water was added to reactor on 12/31.

TABLE 4

MTBE Loading vs. Removal Efficiencies - Continuous Operation

| Date | T-101 MTBE mg/l | T-103 MTBE mg/l | T-102 MLTSS mg/l | Mass of MLTSS (lb) | Loading MTBE/lb TSS-day | MTBE Removed Removed (lb/day) | % Removed | (lb MTBE /lb TSS-day) |
|---|---|---|---|---|---|---|---|---|
| 1/29 | 100 | 3.6 | 2280 | 15.2 | 0.008 | 0.12 | 96.4 | 0.008 |
| 2/2 | 250 | 5.2 | NA | NA | NA | 0.31 | 97.9 | NA |
| 2/7 | NS | 51 | 2740 | 18.3 | NA | NA | NA | NA |
| 2/9 | NS | 18 | 4400 | 29.4 | NA | NA | NA | NA |
| 2/12 | 240 | 20 | 2050 | 13.7 | 0.022 | 0.28 | 91.7 | 0.020 |
| 2/16 | 200 | 9.5 | 1760 | 11.7 | 0.022 | 0.24 | 95.3 | 0.021 |
| 2/19 | 280 | 11 | 1620 | 10.8 | 0.033 | 0.34 | 96.1 | 0.032 |
| 2/21 | NS | NS | 1280 | 8.5 | NA | NA | NA | NA |
| 2/26 | 410 | 1.6 | 1030 | 6.9 | 0.119 | 0.82 | 99.6 | 0.119 |
| 3/1 | 780 | 24 | 1300 | 8.7 | 0.180 | 1.51 | 96.9 | 0.174 |
| 3/4 | 680 | 24 | 1400 | 9.3 | 0.146 | 1.31 | 96.5 | 0.140 |
| 3/7 | 770 | 30 | 1620 | 10.8 | 0.142 | 1.48 | 96.1 | 0.137 |
| 3/11 | 2000 | 60 | 1910 | 12.8 | 0.314 | 3.88 | 97.0 | 0.304 |
| 3/14 | 1100 | 88 | 2430 | 16.2 | 0.136 | 2.02 | 92.0 | 0.125 |
| 3/18 | 1900 | 10 | 2300 | 15.4 | 0.247 | 3.78 | 99.5 | 0.246 |
| 3/21 | 1600 | 120 | 2110 | 14.1 | 0.227 | 2.96 | 92.5 | 0.210 |
| 3/25 | 1590 | 45 | 1860 | 12.4 | 0.241 | 2.91 | 97.0 | 0.234 |
| 3/28 | 2000 | 92 | 2390 | 16.0 | 0.250 | 3.82 | 95.4 | 0.239 |
| 4/1 | 2200 | 70 | 2490 | 16.6 | 0.264 | 4.26 | 96.8 | 0.256 |
| 4/4 | 2400 | 49 | 2650 | 17.7 | 0.271 | 4.70 | 98.0 | 0.266 |
| 4/8 | 1700 | 91 | 3170 | 21.2 | 0.161 | 3.22 | 94.6 | 0.152 |
| Avg. | 1083 | 39 | 2085 | 13.9 | 0.164 | 2.04 | 96.2 | 0.158 |

T-101 = Equalization Tank;
T-102 = Bioreactor;
T-103 = Effluent Proof Tank

After an initial start-up period of only 4 days, the reactor operated successfully for approximately 4 months. Greater than 90% MTBE removal was achieved throughout the demonstration, despite great fluctuations in pH and temperature, and an increasing MTBE concentration from 40 mg/L to >2000 mg/L. During continuous feeding, mixed liquor suspended solids increased to >3000 mg/L. Loss of MTBE caused by stripping/volatilization averaged only 4.5% during the demonstration, as shown the measurements presented in Table 5 below.

TABLE 5

Volatilization Losses

| | 3/7 | 3/25 | 4/1 | 4/8 | 4/15 | Averages |
|---|---|---|---|---|---|---|
| Influent MTBE mg/L | 770 | 1500 | 2200 | 1700 | 1700 | 1574 |
| Influent Flow gpm | 0.177 | 0.167 | 0.172 | 0.184 | 0.186 | 0.177 |
| Influent MTBE lbs/day | 1.64 | 3.01 | 4.54 | 3.75 | 3.79 | 3.35 |
| Headspace MTBE ppmv | 190 | 25 | 300 | 210 | 78 | 161 |
| Air Flow scfh | 160 | 200 | 200 | 160 | 200 | 184 |
| MTBE volatilized lbs/day | 0.157 | 0.026 | 0.311 | 0.174 | 0.081 | 0.150 |
| MTBE Loss % | 9.6 | 0.9 | 6.8 | 4.6 | 2.1 | 4.5 |

Example 12
In Situ Remediation of Gasoline Oxygenates

In situ remediation of gasoline oxygenates is performed by adding co-substrates (propane or butane) and oxygen (as air or pure $O_2$) directly to the contaminated media. It is believed that organisms capable of oxidizing propane may have the ability to oxidize butane. Accordingly, it may be desirable in certain situations to utilize butane at a given site. The gas injection will stimulate the growth and degradative activity of naturally-occurring propane or butane-degrading organisms, thereby allowing them to fortuitously degrade the gasoline oxygenates.

Gasses are added to the subsurface either by injection/ vapor extraction (vadose zone) or by in situ gas sparging (saturated zone) as previously described (Marley, M. C., E. X. Droste, H. H. Hopkins, and C. J. Bruell, "Use Air Sparging to Remediate," Environ. Engineer. World, 6–14 (March–April 1996). When these techniques are used to stimulate the growth and activity of natural pollutant degrading microorganisms, they are referred to as "bioventing" and "biosparging", respectively, and "biostimulation" collectively. The use of gas (methane) injection to remediate aquifers contaminated with trichloroethylene has been demonstrated (Semprini, L. and P. L. McCarty, "Comparison between model simulations and field results from in situ biorestoration of chlorinated aliphatics: Part 1, biostimulation of methanotropic bacteria," Ground Water, 29:365–374 (1991); Roberts, P. V., G. D. Hopkins, D. M. Mackay, and L. Semprini, "A field evaluation of in situ biodegradation of chlorinated ethanes: Part I, methodology and field site characterization," Ground Water, 28:591–604 (1990); and Brockman, F. J., W. Payne, D. J. Workman, A. Soong, S. Manley, and T. C. Hazen, "Effect of gaseous nitrogen and phosphorous injection on in situ bioremediation of a trichloroethylene-contaminated site," J. Haz. Material, 41:287–298 (1995)).

To perform in situ biostimulation for destruction of gasoline oxygenates, air, oxygen, propane, and/or butane (co-substrate) is injected into the subsurface by inserting injection wells into either the vadose or saturated zones. Vapor extraction wells are inserted into the vadose zone to capture the gasses and direct the flow of gas within the subsurface. Methods for designing and implementing sparging and vapor extraction systems have been described in detail (Marley, M. D., D. J. Hazebrook, and M. T. Walsh, "The application of in situ air sparging as an innovative soils and groundwater remediation technology," *Groundwater Monitoring Review,* 2:137–145 (1992)). Co-substrate and air/oxygen are injected simultaneously in a 1:100 mixture of propane in air. The system is operated by injecting the gas mixture for 10 min. every half hour at a rate of 10 ft$^3$/min. Alternately, the substrates, air and propane, are added independently by first injecting propane for 4 hours at a rate of 1 to 10 ft$^3$/min., then injecting air at the same rate for 4 hours. If additional nutrients are needed to obtain higher numbers of propane oxidizing bacteria, the gaseous nutrients ammonia and triethylphosphate are injected through the in situ injection system. (See Brockman, F. J. et al. supra.)

The concentration of gasoline oxygenates in the subsurface are monitored by analyzing vapors recovered by the vapor extraction system, and/or by monitoring liquid-phase concentrations of oxygenates in the groundwater. Vapors are collected in Tetlar bags and analyzed by gas chromatography, and aqueous samples are collected from monitoring wells and similarly analyzed by gas chromatography.

To confirm the increase in numbers of indigenous propane oxidizing bacteria, samples of the contaminated media are diluted and spread onto the surface of BSM agar plates. The plates are then incubated in sealed jars containing an atmosphere of propane and air (1:100 v/v). Colonies of propane-oxidizing bacteria are enumerated by counting the colonies that form on the plates. The increase in microbial numbers are determined by comparing the number of organisms present before and after injection of the substrates.

In the event that the numbers of naturally-occurring propane oxidizing bacteria are low and limit the performance of the system, propane-oxidizing bacteria are added to the contaminated media prior to propane and air injection. Propane-oxidizing bacteria (either *M. vaccae* JOB5, ENV420, ENV421, ENV425, indigenous propane oxidizers, or a combination of these) are grown in laboratory or on-site fermentors and injected into wells inserted into the contaminated media. Organisms are added to obtain a final cell concentration of $1\times10^4$ to $1\times10^8$ cells/ml (gm) of contaminated media. Propane and air injection are effected as described above to stimulate the growth and degradative activity of the added organisms. The survival and growth of the added organisms are performed by plating as described above and degradation of gasoline oxygenates is performed by gas chromatographic analysis of vapor, soil, and water samples as previously described.

Example 13
Degradation of Tert-amyl Methylether (TAME) by Propane-Oxidizing Bacteria A number of experiments were conducted to measure the ability of propane-oxidizing bacteria to degrade tert-amyl methyl ether (TAME) after growth on different carbon sources. Cells of *M. vaccae* JOB5, ENV420, ENV421, ENV425 and a mixed bioreactor culture of propane-oxidizing bacteria from a laboratory reactor (termed "TXR") were grown in BSM medium with either propane, acetone, isopropanol, 1-propanol, or ethanol as the sole source of carbon and energy, collected by centrifugation, washed with BSM, and suspended in BSM to an optical density at 550 nm of 2.0. Five milliliters of the cell suspensions, in triplicate, were added to 15 mL serum vials, and the vials were sealed with Teflon-lined septa and crimp tops. Vials containing BSM but no cells, and vials containing HgCl$_2$-poisoned *M. vaccae* JOB5 ("killed") served as controls. Tert-amyl methyl ether was injected through the septa to create a final liquid concentration of 7.8 mg/L. The vials were then incubated at room temperature for 24 hours and the culture fluid was analyzed by gas chromatography as described for MTBE analysis. Data represent the concentration of TAME remaining (in ppm) after incubation with the cell cultures.

The results of these studies are presented in Table 6. The results demonstrate the ability to completely degrade TAME with propane-oxidizing bacteria grown with propane as a sole source of carbon. Similarly, for *M. vaccae* JOB5 and ENV421, other growth on other growth substrates also resulted in complete degradation of TAME.

TABLE 6

Degradation of TAME (tert amyl methyl ether) for 24 Hours by Different Cultures after Growth on Select Media

| Culture | Media | TAME, ppm Remaining after 24 hr incubation | | | |
|---|---|---|---|---|---|
| | | Sample 1 | Sample 2 | Sample 3 | Average |
| Control (BSM) | | 7.5 | 8.3 | 7.6 | 7.8* |
| *M. vaccae*-kill | Acetone | 7.2 | 6.5 | 5.4 | 6.2 |
| *M. vaccae* | Acetone | 0 | 0 | 0 | 0 |
| *M. vaccae* | Propionic Acid | 3.2 | 3.1 | 3.2 | 3.2 |
| *M. vaccae* | Ethanol | 0 | 0 | 0 | 0 |
| *M. vaccae* | Propane | 0 | 0 | 0 | 0 |
| *M. vaccae* | 1-Propanol | 0 | 0 | 0 | 0 |
| 420 | Ethanol | 4.6 | 4.8 | 4.6 | 4.7 |
| 420 | 1-Propanol | 7.3 | 7.7 | 7.7 | 7.6 |
| 420 | Propane | 0 | 0 | 0 | 0 |
| 421 | Ethanol | 4.3 | 4.0 | 3.9 | 4.1 |
| 421 | 1-Propanol | 0 | 0 | 0 | 0 |
| 421 | Propane | 0 | 0 | 0 | 0 |
| 425 | Acetone | 0 | 0 | 2.8 | 0.9 |
| 425 | Isopropanol | 4.6 | 4.7 | 5.0 | 4.8 |
| 425 | Propionic Acid | 0 | 0 | 0 | 0 |
| 425 | Ethanol | 2.7 | 2.6 | 0 | 1.8 |
| 425 | Propane | 0 | 0 | 0 | 0 |
| TXR | Acetone | 3.8 | 3.8 | 2.8 | 3.5 |
| TXR | Propionic Acid | 4.0 | 4.1 | 4.1 | 4.1 |
| TXR | Ethanol | 4.5 | 4.5 | 4.7 | 4.6 |
| TXR | Isopropanol | 3.7 | 3.9 | 3.7 | 3.8 |
| TXR | Propane | 0 | 0 | 0 | 0 |

*Starting Concentration

Example 14
Degradation of Tetrahydrofuran

To test the ability of propane oxidizing bacteria to degrade other environmentally-significant ether pollutants, ENV425 and a mixed culture of propane oxidizing bacteria from a laboratory bioreactor were incubated with tetrahydrofuran, and the degradation of tetrahydrofuran was measured after 48 hours. Cells of ENV425 and a mixed bioreactor culture of propane-oxidizing bacteria (termed "TXR") were grown in BSM medium with propane as the sole source of carbon and energy, collected by centrifugation, washed with BSM, and suspended in BSM to an optical density at 550 nm of 2.0. Five ml of the cell suspensions were added to 15 mL serum vials, and the vials were sealed with Teflon-lined septa and crimp tops. Vials containing BSM but no cells served as controls. Tetrahydrofuran was injected through the septa to create a final liquid concentration of 40 mg/L. The vials were then incubated at room temperature for 48 hours and analyzed by gas chromatography of subsamples of the vial headspace gas. Gas chromatography was performed as described for MTBE analysis.

Results of the tetrahydrofuran degradation study demonstrated that 100% of the tetrahydrofuran was degraded in samples containing either ENV425 or the mixed culture of propane-oxidizing bacteria, whereas no tetrahydrofuran was degraded in cell-free control samples. No other volatile degradation products were identified in samples containing ENV425 or the mixed culture of propane oxidizing bacteria.

What is claimed is:

1. A method for monitoring the degradation of methyl tert-butyl ether in a contaminated media which contains methyl tert-butyl ether and/or which is treated under conditions which cause the degradation of methyl tert-butyl ether into 2-hydroxy isobutyric acid comprising: (A) evaluating the treated contaminated media to determine the absence or presence therein of 2-hydroxy isobutyric acid; (B) based on such evaluation, determining whether said conditions should be modified; and (C) modifying such conditions as may be necessary.

2. A method for degrading an ether comprising contacting said ether with bacteria that are effective in oxidizing propane or isopropanol and 2-hydroxy-isobutyric acid.

3. The method according to claim 2 wherein said bacteria is a propane- or isopropanol-oxidizing bacteria which has been modified genetically to contain genes encoding enzymes which are effective in oxidizing 2-hydroxy isobutyric acid.

4. The method according to claim 2 wherein said bacteria is a 2-hydroxy isobutyric acid-oxidizing bacteria which has been modified genetically to contain genes encoding enzymes which are effective in oxidizing propane or isopropanol.

5. The method according to claim 2 wherein said bacteria is a bacteria which has been modified genetically to contain genes encoding enzymes which are effective in oxidizing propane or isopropanol and genes encoding enzymes which are effective in oxidizing 2-hydroxy isobutyric acid.

6. A method for degrading an ether comprising contacting said ether with a propane- or isopropanol-oxidizing bacteria and a bacteria which is effective in oxidizing 2-hydroxy isobutyric acid.

* * * * *